(12) United States Patent
Buchwitz et al.

(10) Patent No.: US 11,639,684 B2
(45) Date of Patent: May 2, 2023

(54) EXHAUST GAS BYPASS VALVE CONTROL FOR A TURBOCHARGER FOR A TWO-STROKE ENGINE

(71) Applicant: Polaris Industries Inc., Medina, MN (US)

(72) Inventors: James H. Buchwitz, Strathcona, MN (US); Darren J. Hedlund, Roseau, MN (US); Derek Zimney, Roseau, MN (US); Lucas R. Salfer, Salol, MN (US); Reed A. Hanson, Roseau, MN (US); Dallas J. Blake, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 627 days.

(21) Appl. No.: 16/692,795

(22) Filed: Nov. 22, 2019

(65) Prior Publication Data
US 2020/0182167 A1    Jun. 11, 2020

Related U.S. Application Data

(60) Provisional application No. 62/776,635, filed on Dec. 7, 2018.

(51) Int. Cl.
*F02B 37/18* (2006.01)
*F02B 57/06* (2006.01)
(Continued)

(52) U.S. Cl.
CPC ............ *F02B 37/183* (2013.01); *F01N 13/10* (2013.01); *F02B 57/06* (2013.01); *F02D 31/005* (2013.01)

(58) Field of Classification Search
CPC .... F02B 37/183; F02B 57/06; F02D 2250/34; F02D 2700/04
See application file for complete search history.

(56) References Cited

U.S. PATENT DOCUMENTS

| | | | |
|---|---|---|---|
| 1,656,629 | A | 1/1928 | Gray |
| 1,874,326 | A | 8/1932 | Mason |

(Continued)

FOREIGN PATENT DOCUMENTS

| | | |
|---|---|---|
| CN | 207648298 U | 7/2018 |
| CN | 110195644 A | 9/2019 |

(Continued)

OTHER PUBLICATIONS

Office Action issued in corresponding Canadian Application No. 3,063,162 dated Aug. 20, 2021 (4 pages).

(Continued)

*Primary Examiner* — John Kwon
*Assistant Examiner* — Arnold Castro
(74) *Attorney, Agent, or Firm* — Harness, Dickey & Pierce, P.L.C.

(57) ABSTRACT

A system and method of operating the same includes an engine speed sensor determining an engine speed, an exhaust gas bypass valve, an exhaust gas bypass valve actuator coupled to the exhaust gas bypass valve and a controller. The controller partially opens the exhaust gas bypass valve with a first predetermined effective area greater than fully closed when the engine speed is at idle. The controller determines an acceleration event, holding the exhaust gas bypass valve open at least a second predetermined effective area greater than fully closed in response to the acceleration event.

20 Claims, 33 Drawing Sheets

(51) Int. Cl.
  *F02D 31/00* (2006.01)
  *F01N 13/10* (2010.01)

(56) References Cited

U.S. PATENT DOCUMENTS

| | | |
|---|---|---|
| 2,047,443 A | 7/1936 | Starkweather |
| 3,045,419 A | 7/1962 | Addie et al. |
| 3,190,271 A | 6/1965 | Gudmundsen |
| 3,614,259 A | 10/1971 | Neff |
| 3,653,212 A | 4/1972 | Gast et al. |
| 3,703,937 A | 11/1972 | Tenney |
| 3,868,822 A | 3/1975 | Keller |
| 3,870,115 A | 3/1975 | Hase |
| 4,005,579 A | 2/1977 | Lloyd |
| 4,047,507 A | 9/1977 | Noguchi et al. |
| 4,169,354 A | 10/1979 | Woollenweber |
| 4,235,484 A | 11/1980 | Owen et al. |
| 4,254,625 A | 3/1981 | Bergstedt et al. |
| 4,289,094 A | 9/1981 | Tanahashi |
| 4,305,351 A | 12/1981 | Staerzl |
| 4,349,000 A | 9/1982 | Staerzl |
| 4,468,928 A | 9/1984 | Suzuki |
| 4,512,152 A | 4/1985 | Asaba |
| 4,598,549 A | 7/1986 | Kanawyer |
| 4,628,877 A | 12/1986 | Sundles et al. |
| 5,050,559 A | 9/1991 | Kurosu et al. |
| 5,051,909 A | 9/1991 | Gomez et al. |
| 5,085,193 A | 2/1992 | Morikawa |
| 5,121,604 A | 6/1992 | Berger et al. |
| 5,191,531 A | 3/1993 | Kurosu et al. |
| 5,197,426 A | 3/1993 | Frangesch et al. |
| 5,214,919 A | 6/1993 | Jiewertz et al. |
| 5,427,083 A | 6/1995 | Ahern |
| 5,441,030 A | 8/1995 | Satsukawa |
| 5,579,740 A | 12/1996 | Cotton et al. |
| 5,586,524 A | 12/1996 | Nonaka et al. |
| 5,630,395 A | 5/1997 | Katoh et al. |
| 5,726,397 A | 3/1998 | Mukai et al. |
| 5,782,214 A | 7/1998 | Nanami et al. |
| 5,791,304 A | 8/1998 | Taipale |
| 5,813,374 A | 9/1998 | Chasteen |
| 5,832,901 A | 11/1998 | Yoshida et al. |
| 6,073,447 A | 6/2000 | Kawakami et al. |
| 6,158,214 A | 12/2000 | Kempka et al. |
| 6,161,384 A | 12/2000 | Reinbold et al. |
| 6,162,028 A | 12/2000 | Rembold |
| 6,170,463 B1 | 1/2001 | Koerner |
| 6,209,530 B1 | 4/2001 | Faletti et al. |
| 6,435,169 B1 | 8/2002 | Vogt |
| 6,443,123 B1 | 9/2002 | Aoki et al. |
| 6,658,849 B1 | 12/2003 | Hallman et al. |
| 6,739,579 B1 | 5/2004 | Rim |
| 6,745,568 B1 | 6/2004 | Squires |
| 6,830,121 B1 | 12/2004 | Johnson |
| 6,942,052 B1 | 9/2005 | Blakely |
| 6,976,359 B2 | 12/2005 | Hastings et al. |
| 6,983,596 B2 | 1/2006 | Frankenstein et al. |
| 7,017,706 B2 | 3/2006 | Brown et al. |
| 7,621,127 B2 | 11/2009 | Robinson |
| 7,794,213 B2 | 9/2010 | Gaude et al. |
| 8,128,356 B2 | 3/2012 | Higashimori |
| 8,220,262 B2 | 7/2012 | Robinson |
| 8,474,789 B2 | 7/2013 | Shimada et al. |
| 8,483,932 B2 | 7/2013 | Pursifull |
| 8,490,605 B2 | 7/2013 | Gracner et al. |
| 8,528,327 B2 | 9/2013 | Bucknell et al. |
| 8,641,363 B2 | 2/2014 | Love et al. |
| 8,671,683 B2 | 3/2014 | Lilly |
| 9,188,048 B2 | 11/2015 | Bedard |
| 9,322,323 B2 | 4/2016 | Panciroli |
| 9,630,611 B1 | 4/2017 | Dufford |
| 9,670,833 B2 | 6/2017 | Klipfel et al. |
| 9,719,469 B1 * | 8/2017 | Pelfrey ............. F02M 35/104 |
| 10,989,124 B2 | 4/2021 | Yamaguchi et al. |
| 11,131,235 B2 | 9/2021 | Buchwitz et al. |
| 11,255,231 B2 | 2/2022 | Fuhrman et al. |
| 2001/0023683 A1 | 9/2001 | Nakamura et al. |
| 2001/0032601 A1 | 10/2001 | Galka et al. |
| 2001/0047656 A1 | 12/2001 | Maddock et al. |
| 2002/0078934 A1 | 6/2002 | Hohkita et al. |
| 2002/0124817 A1 | 9/2002 | Abei |
| 2003/0029663 A1 | 2/2003 | Etou |
| 2003/0236611 A1 | 12/2003 | James et al. |
| 2005/0039722 A1 | 2/2005 | Montgomery et al. |
| 2006/0175107 A1 | 8/2006 | Etou |
| 2006/0185632 A1 | 8/2006 | Mavinahally |
| 2007/0062188 A1 | 3/2007 | Fry et al. |
| 2007/0113829 A1 | 5/2007 | Allen |
| 2007/0234997 A1 | 10/2007 | Prenger |
| 2007/0289302 A1 | 12/2007 | Funke et al. |
| 2008/0060617 A1 | 3/2008 | Adachi et al. |
| 2008/0250786 A1 | 10/2008 | Robinson |
| 2008/0264380 A1 | 10/2008 | Kang et al. |
| 2008/0276906 A1 | 11/2008 | Thomas |
| 2009/0276141 A1 | 11/2009 | Surnilla et al. |
| 2010/0024786 A1 | 2/2010 | Robinson |
| 2010/0036585 A1 | 2/2010 | Scharfenberg |
| 2010/0041287 A1 | 2/2010 | Woods et al. |
| 2010/0114454 A1 | 5/2010 | French et al. |
| 2010/0213000 A1 | 8/2010 | Inoue |
| 2010/0243343 A1 | 9/2010 | Rasmussen |
| 2010/0313418 A1 | 12/2010 | St. Mary |
| 2011/0061637 A1 | 3/2011 | Mavinahally et al. |
| 2011/0093182 A1 | 4/2011 | Weber et al. |
| 2011/0186013 A1 | 8/2011 | Sasaki |
| 2011/0296835 A1 | 12/2011 | Ebisu |
| 2012/0018468 A1 | 1/2012 | Dunican, Sr. |
| 2012/0060494 A1 | 3/2012 | Sato et al. |
| 2012/0181468 A1 | 7/2012 | Telep et al. |
| 2012/0255379 A1 | 10/2012 | Lim et al. |
| 2012/0269620 A1 | 10/2012 | Boening et al. |
| 2012/0282078 A1 | 11/2012 | Marsal et al. |
| 2012/0285177 A1 | 11/2012 | Swenson et al. |
| 2012/0285427 A1 | 11/2012 | Hayman et al. |
| 2012/0316756 A1 | 12/2012 | Tsuyuki |
| 2013/0111900 A1 | 5/2013 | Hagner et al. |
| 2014/0158089 A1 | 6/2014 | Glugla et al. |
| 2014/0360178 A1 | 12/2014 | Wang |
| 2014/0366815 A1 | 12/2014 | Lu |
| 2015/0167593 A1 | 6/2015 | Kim et al. |
| 2015/0240707 A1 | 8/2015 | Wang et al. |
| 2016/0010541 A1 | 1/2016 | Wang et al. |
| 2016/0040566 A1 | 2/2016 | Barole et al. |
| 2016/0061139 A1 | 3/2016 | Imai et al. |
| 2016/0341116 A1 | 11/2016 | French |
| 2017/0016407 A1 | 1/2017 | Whitney et al. |
| 2017/0022927 A1 | 1/2017 | Sanborn et al. |
| 2017/0051684 A1 | 2/2017 | Lahti et al. |
| 2017/0058760 A1 | 3/2017 | Shor |
| 2017/0152794 A1 | 6/2017 | Patil et al. |
| 2017/0276067 A1 | 9/2017 | Hand, III et al. |
| 2017/0292631 A1 | 10/2017 | Muraoka |
| 2018/0003103 A1 | 1/2018 | Kawamura et al. |
| 2018/0051622 A1 | 2/2018 | Liu et al. |
| 2018/0283270 A1 | 10/2018 | Niwa |
| 2018/0347455 A1 | 12/2018 | Noda et al. |
| 2019/0055862 A1 | 2/2019 | Fuhrman et al. |
| 2019/0063304 A1 | 2/2019 | Lefebvre et al. |
| 2019/0136754 A1 | 5/2019 | Brin et al. |
| 2019/0136818 A1 | 5/2019 | Blake et al. |
| 2019/0178197 A1 | 6/2019 | Okamura |
| 2019/0323510 A1 | 10/2019 | Serbes |
| 2020/0182139 A1 | 6/2020 | Buchwitz et al. |
| 2021/0040907 A1 | 2/2021 | Christensen et al. |
| 2021/0078674 A1 | 3/2021 | Schuehmacher et al. |
| 2021/0131366 A1 | 5/2021 | Blake et al. |

FOREIGN PATENT DOCUMENTS

| | | |
|---|---|---|
| JP | H05180056 A | 7/1993 |
| JP | 2000248920 A | 9/2000 |
| JP | 2002276383 A | 9/2002 |
| JP | 2008223626 A | 9/2008 |
| JP | 4661612 B2 | 3/2011 |

(56) References Cited

FOREIGN PATENT DOCUMENTS

| | | |
|---|---|---|
| JP | 5001918 B2 | 8/2012 |
| KR | 20010059144 A | 7/2001 |
| RU | 2706329 C1 | 11/2019 |
| SE | 535726 C2 | 11/2012 |

OTHER PUBLICATIONS

Office Action issued in corresponding Canadian Application No. 3,063,162 dated Sep. 16, 2021 (6 pages).
Office Action issued in corresponding Canadian Application No. 3,063,164 dated Feb. 14, 2022.
"Garrett by Honeywell", 2016, Honeywell, vol. 6 (Year: 2016).
Office Action dated Mar. 9, 2021 in counterpart Canadian App. No. 3,063, 162.
Canadian Office Action dated Apr. 6, 2022 in corresponding Canadian Application No. 3,063,132 (5 pages).
Canadian Office Action dated Nov. 17, 2022 in corresponding Canadian Application No. 3,105,244.

\* cited by examiner

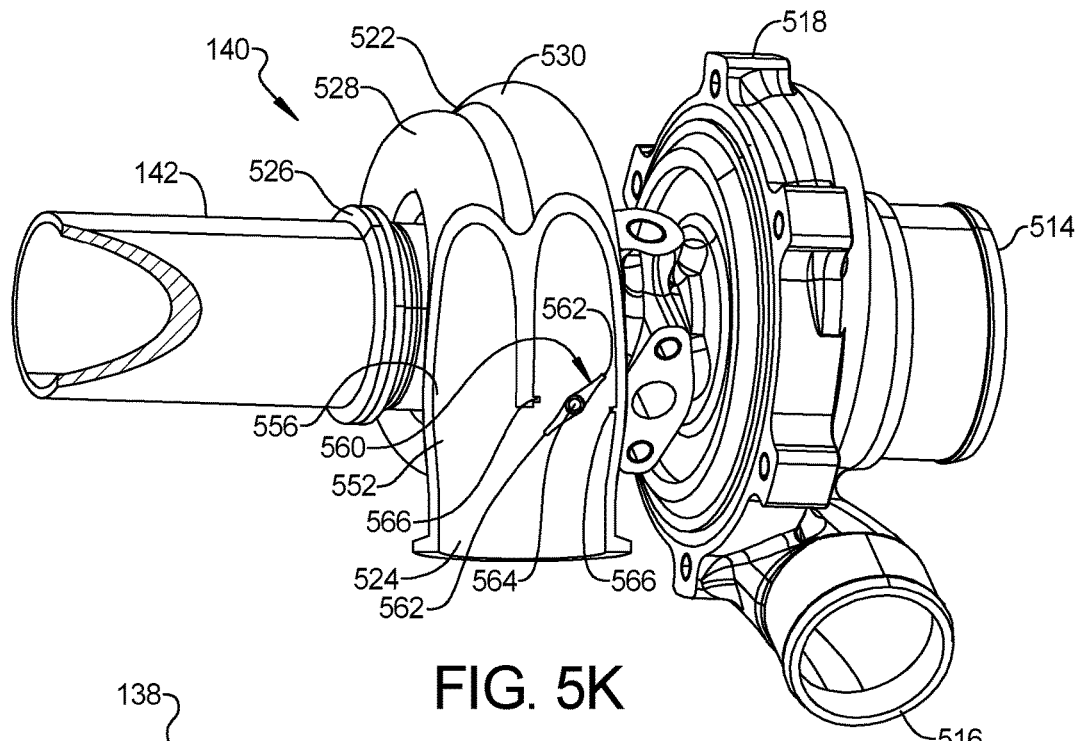
FIG. 5K
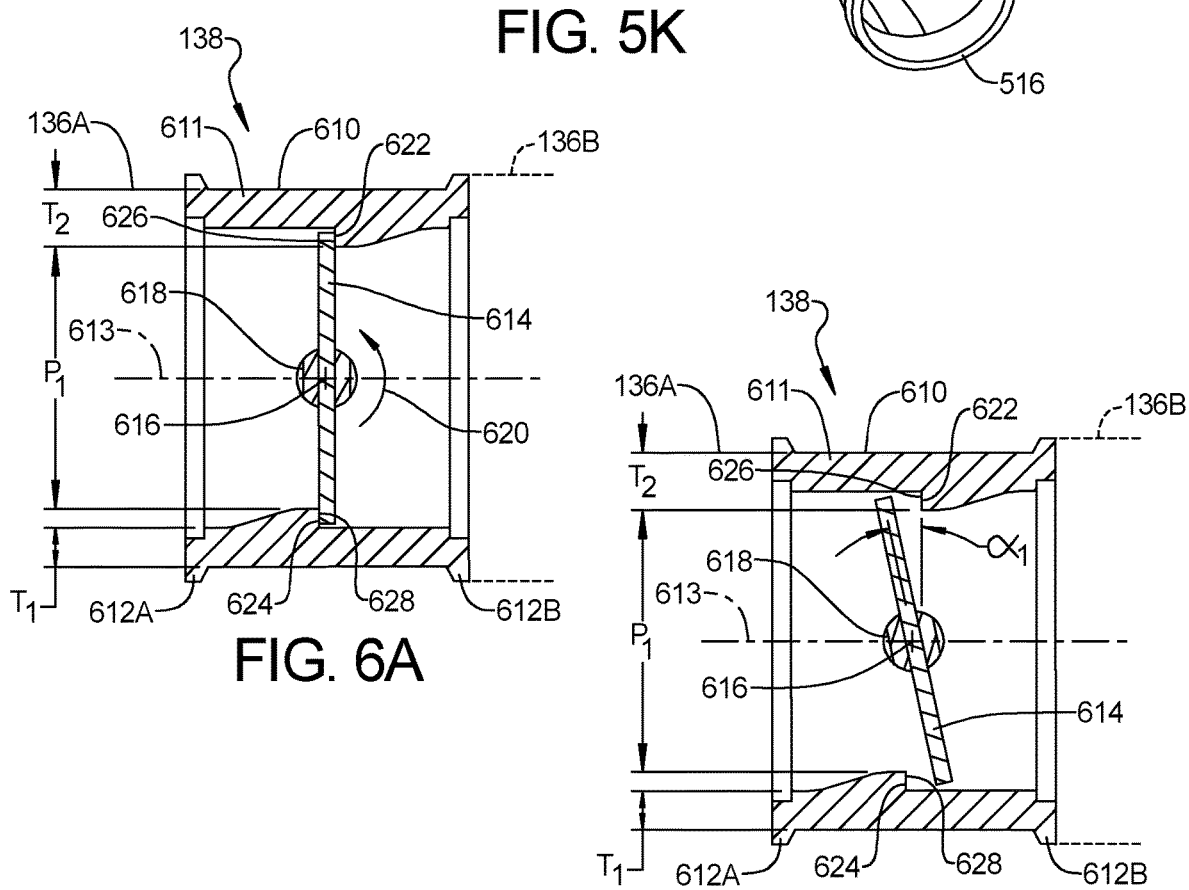
FIG. 6A
FIG. 6B

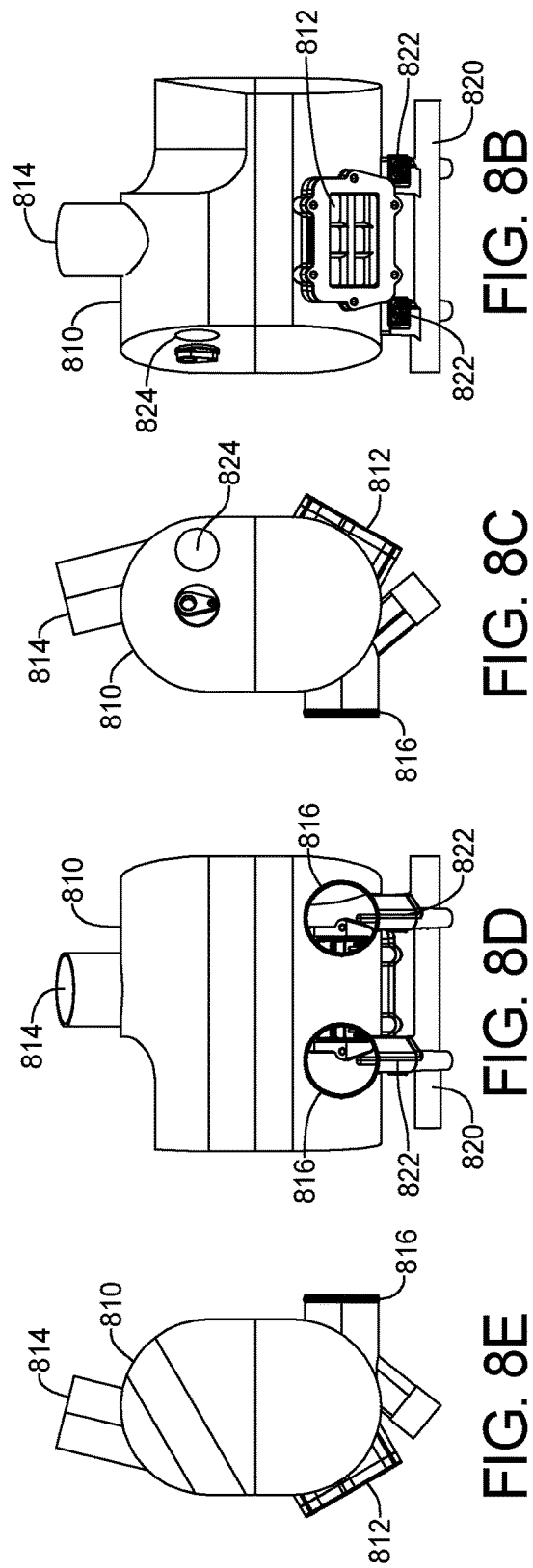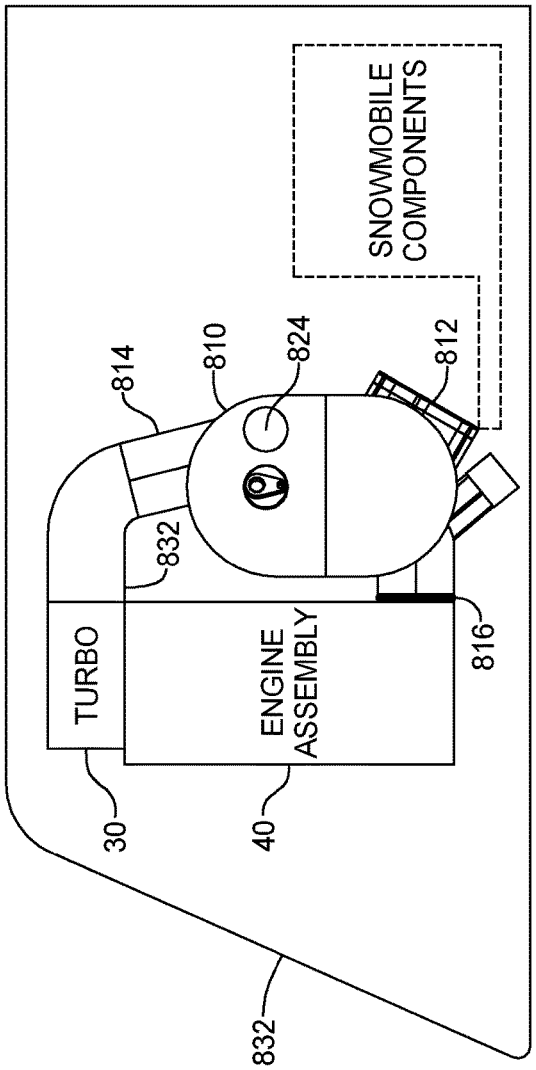

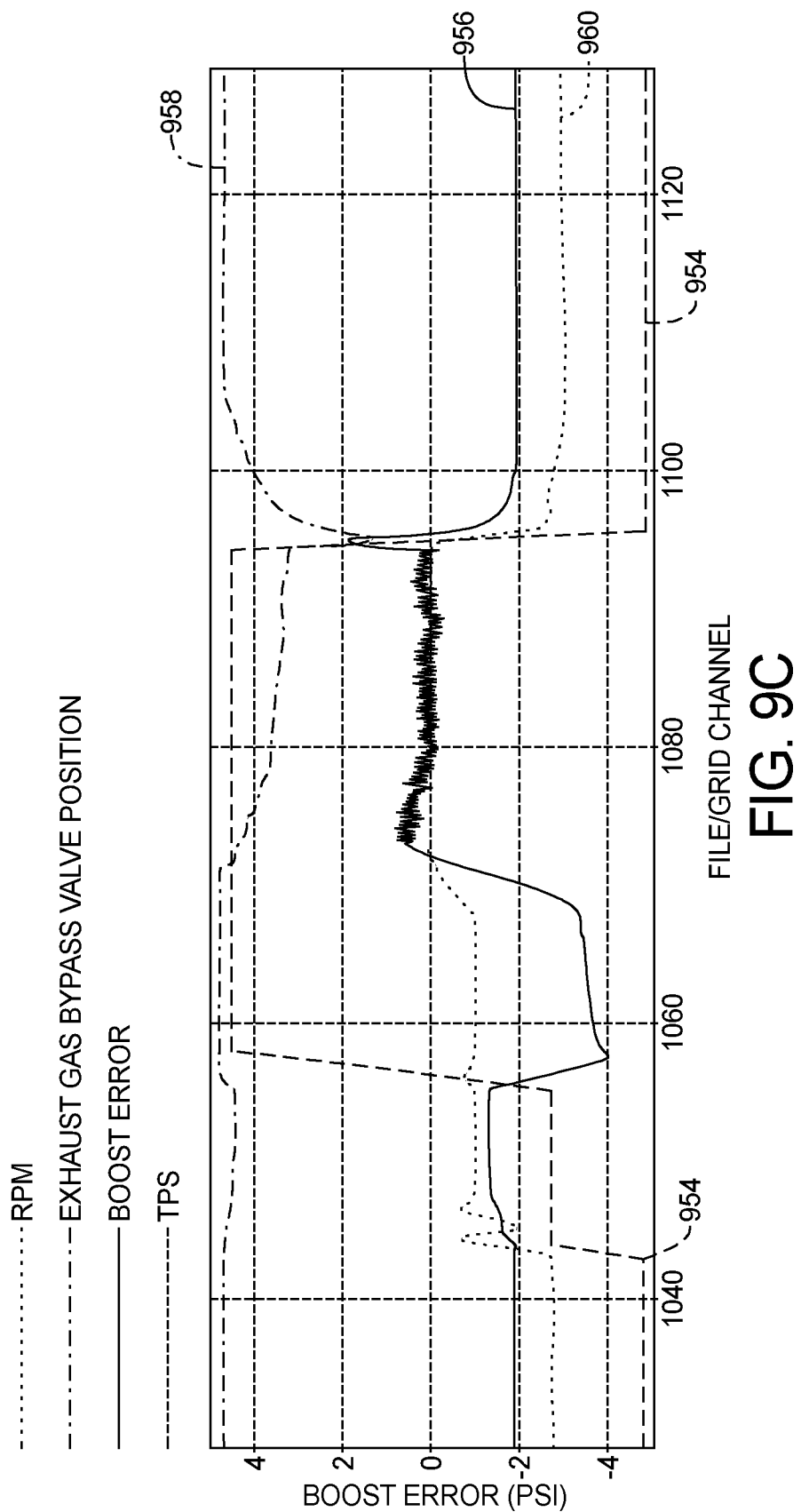

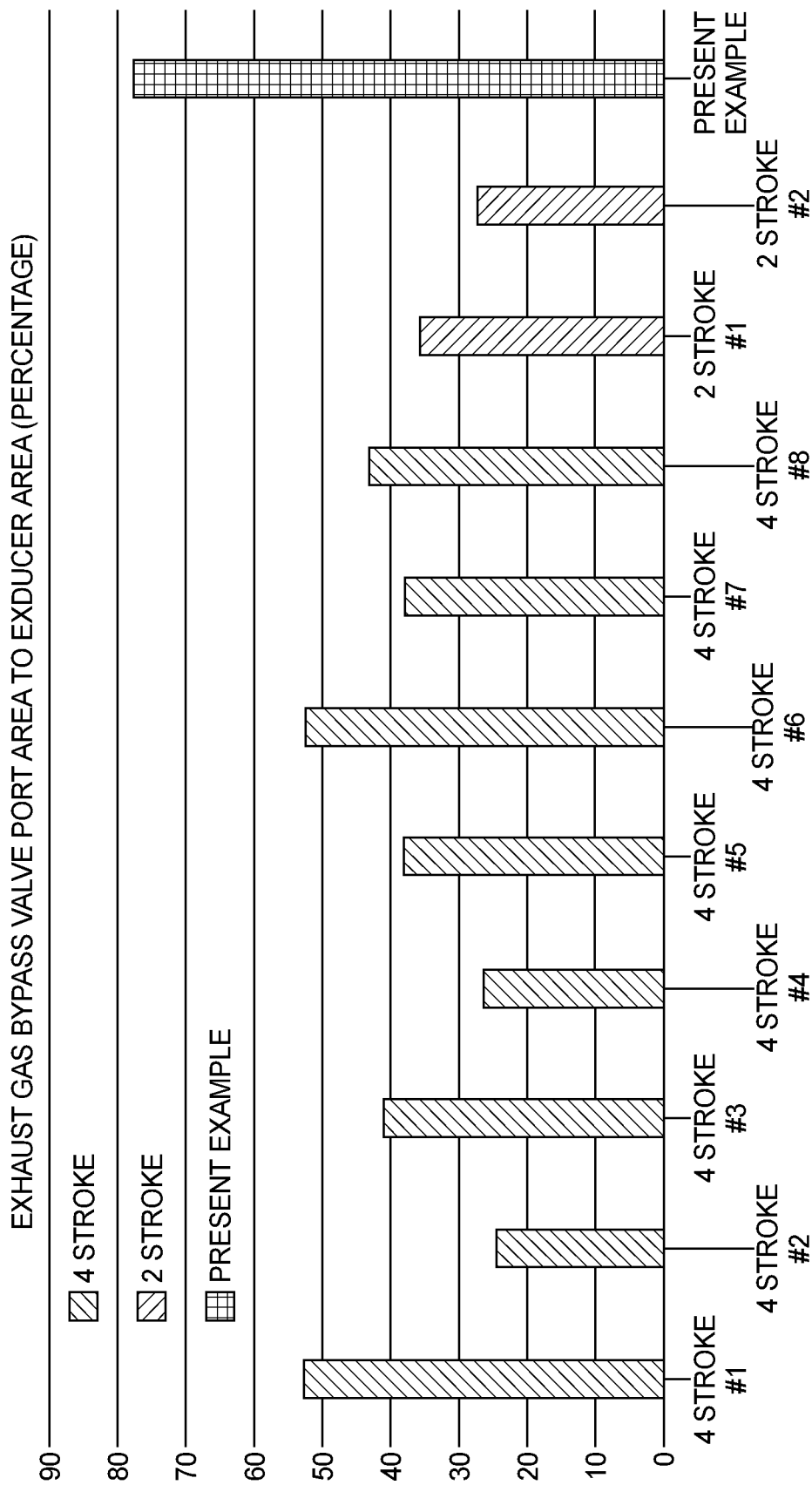

EXHAUST GAS BYPASS VALVE CONTROL FOR A TURBOCHARGER FOR A TWO-STROKE ENGINE

CROSS-REFERENCE TO RELATED APPLICATIONS

This application claims priority to U.S. Provisional Application No. 62/776,635, filed on Dec. 7, 2018. The above-mentioned patent application is incorporated herein by reference in its entirety.

FIELD

The present disclosure relates to a vehicle engine and, more particularly, to controlling the opening of an exhaust gas bypass valve in response to sensed conditions.

BACKGROUND

This section provides background information related to the present disclosure which is not necessarily prior art.

A vehicle, such as a snowmobile, generally includes an engine assembly. The engine assembly is operated with the use of fuel to generate power to drive the vehicle. The power to drive a snowmobile is generally generated by a combustion engine that drives pistons and a connected crank shaft. Two-stroke snowmobile engines are highly tuned, and high specific power output engines that operate under a wide variety of conditions.

Vehicle manufacturers are continually seeking ways to improve the power output for engines. Turbochargers have been used together with two-stroke engines to provide increased power output. However, improving performance of a turbocharged two-stroke engine is desirable. Back pressure in a two stroke engine has an effect on engine performance.

SUMMARY

This section provides a general summary of the disclosures, and is not a comprehensive disclosure of its full scope or all of its features.

In one aspect of the disclosure, a method of operating an exhaust gas bypass valve includes determining an engine speed. When the engine speed is at idle, partially opening the exhaust gas bypass valve with a first predetermined effective area greater than fully closed. The method further includes determining an acceleration event and holding the exhaust gas bypass valve open at least a second predetermined effective area greater than fully closed in response to the acceleration event.

In another aspect of the disclosure, a system for operating an engine includes an engine speed sensor determining an engine speed, an exhaust gas bypass valve, an exhaust gas bypass valve actuator coupled to the exhaust gas bypass valve and a controller. The controller partially opens the exhaust gas bypass valve with a first predetermined effective area greater than fully closed when the engine speed is at idle. The controller determines an acceleration event, holding the exhaust gas bypass valve open at least a second predetermined effective area greater than fully closed in response to the acceleration event.

Further areas of applicability will become apparent from the description provided herein. The description and specific examples in this summary are intended for purposes of illustration only and are not intended to limit the scope of the present disclosure.

DRAWINGS

FIG. 1 is a perspective view of a snowmobile.
FIG. 2 is an exploded view of the snowmobile of FIG. 1.
FIGS. 2A and 2B are enlarged exploded views of FIG. 2.
FIG. 3 is a block diagram of the engine of FIG. 2.
FIG. 4 is an exploded view of the engine of FIG. 3.
FIG. 5A is a perspective view of a turbocharger according to the present disclosure.
FIG. 5B is a side view of the turbocharger FIG. 5A.
FIG. 5C is a cutaway view of the turbine housing of the turbocharger of FIG. 5A.
FIG. 5D is a partial cross-sectional view of the turbine housing of the turbocharger of FIG. 5A.
FIG. 5E is a cutaway view of the turbocharger having the diverter valve in a position closing off the first scroll.
FIG. 5F is a partial cutaway view of the turbocharger having the diverter valve in a neutral position.
FIG. 5G is a partial cutaway view of the turbocharger having the diverter valve in a position closing off the second scroll.
FIG. 5H is a partial cutaway view of an alternate valve for controlling flow to the scrolls in a partially open position.
FIG. 5I is a partial cutaway view of the valve in FIG. 5H in a closed position.
FIG. 5J is a partial cutaway view of another alternate valve for controlling flow to one of the scrolls in a closed position.
FIG. 5K is a partial cutaway view of the valve in FIG. 5J in a partially open position.
FIG. 6A is a cross-sectional view of an exhaust gas bypass valve.
FIG. 6B is the exhaust bypass valve of FIG. 6A in a first open position.
FIG. 6C is the exhaust bypass valve of FIG. 6A in a second open position.
FIG. 6D is the exhaust bypass valve of FIG. 6A in a third open position.
FIG. 6E is the exhaust bypass valve of FIG. 6A in a fully open position.
FIG. 6F is a perspective view of the exhaust bypass valve with an actuator arm.
FIG. 6G is an end view of the exhaust bypass valve in the position illustrated in FIG. 6E.
FIG. 6H is a block diagrammatic view of a system for operating the exhaust bypass valve of FIG. 6A.
FIG. 6I is a perspective view of an exhaust bypass valve and diverter valve controlled by a common actuator.
FIG. 7A is a schematic view of a system for bypassing exhaust gas.
FIG. 7B is a schematic view of a second example for bypassing exhaust gas.
FIG. 7C is a schematic view of a third example of bypassing exhaust gas.
FIG. 7D is a schematic view of a fourth example of bypassing exhaust gas.
FIG. 7E is a diagrammatic representation of an engine system including exhaust bypass for increasing the stability of a two-stroke engine.
FIG. 7F is a diagrammatic representation of an engine assembly comprising a second example of increasing the stability of a two stoke engine.

Figure 8A:
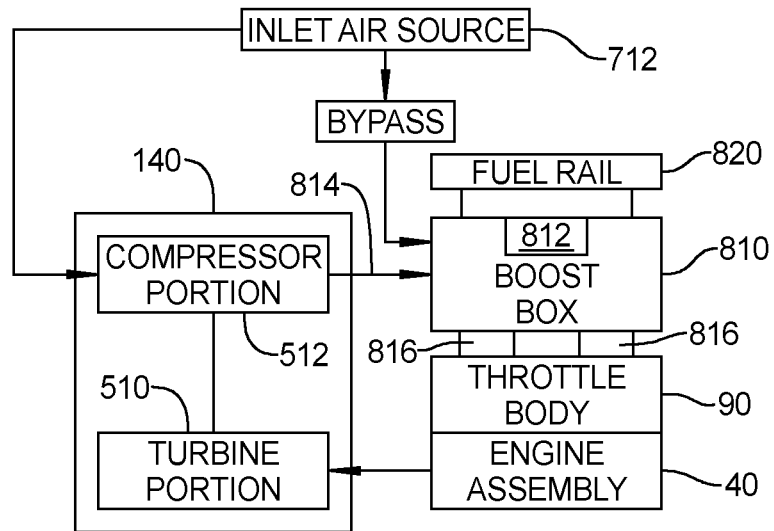
FIG. 8A is a schematic view of a system for bypassing the compressor of a turbocharged engine to provide airflow to the engine.
Figure 8F:
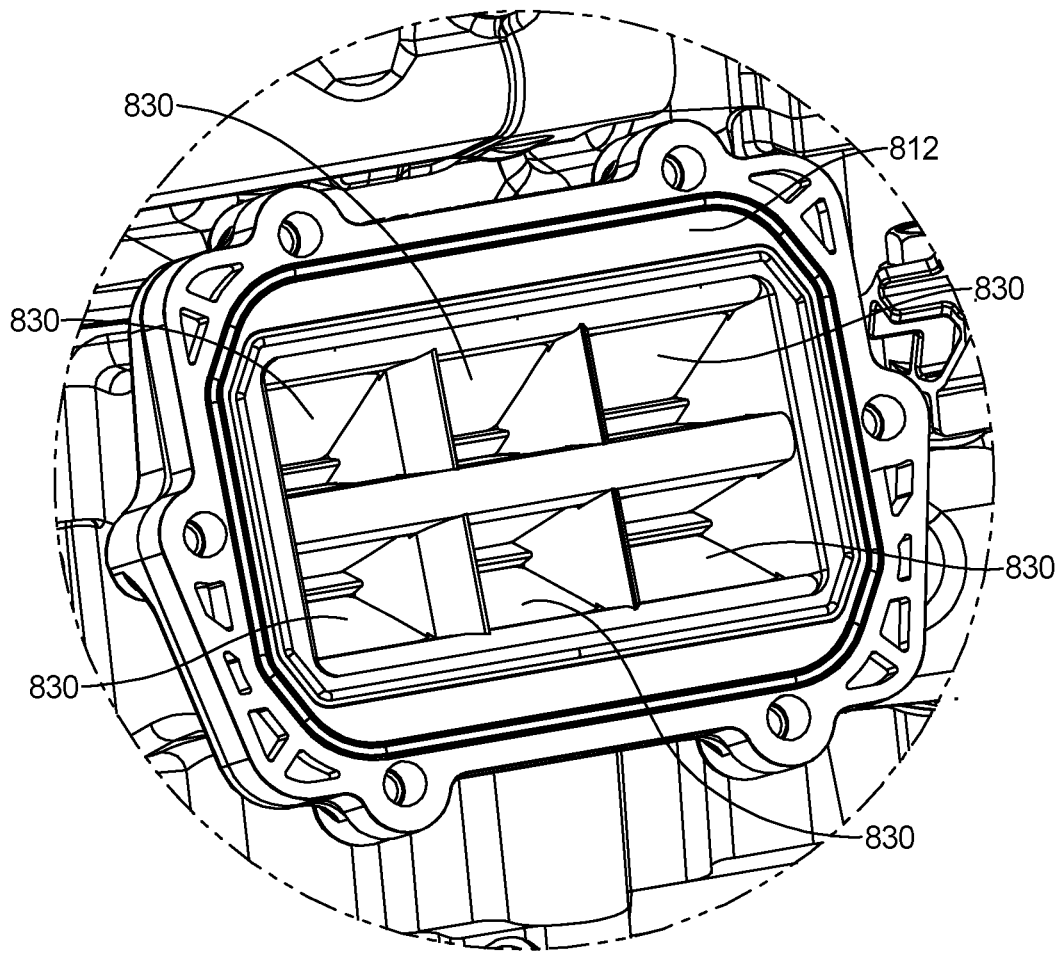

FIG. 8B is a rear side of the boost box of FIG. 8A.
FIG. 8C is a left side view of the boost box of FIG. 8A.
FIG. 8D is a front side view of the boost box of FIG. 8A.
FIG. 8E is a right side view of the boost box of FIG. 8A.
FIG. 8F is an enlarged view of the one way valve of FIG. 8A.

FIG. 8G is a side view of an engine compartment having the boost box oriented so that the one way valve is located rearwardly.

Figure 8H:
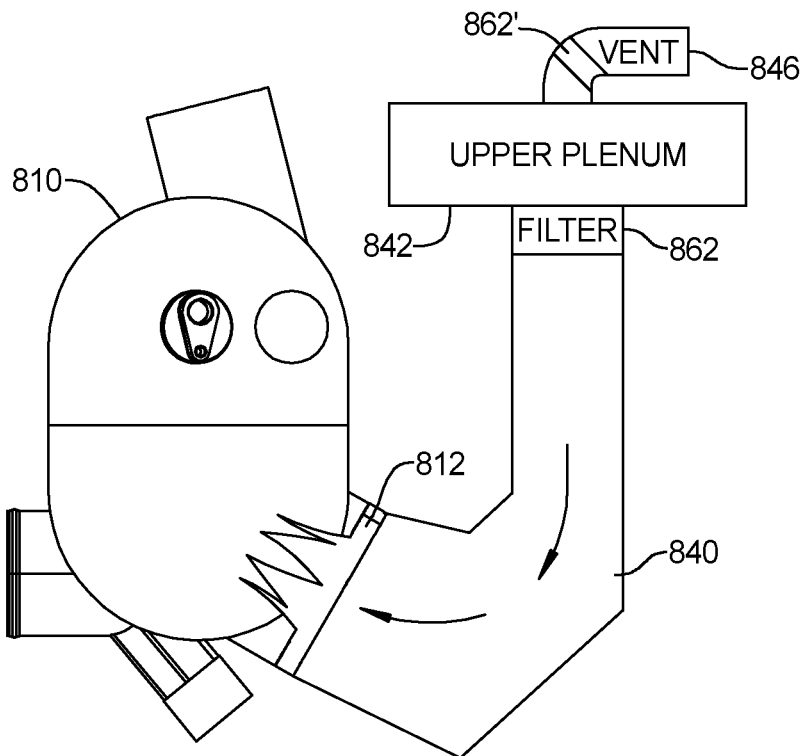
Figure 8I:
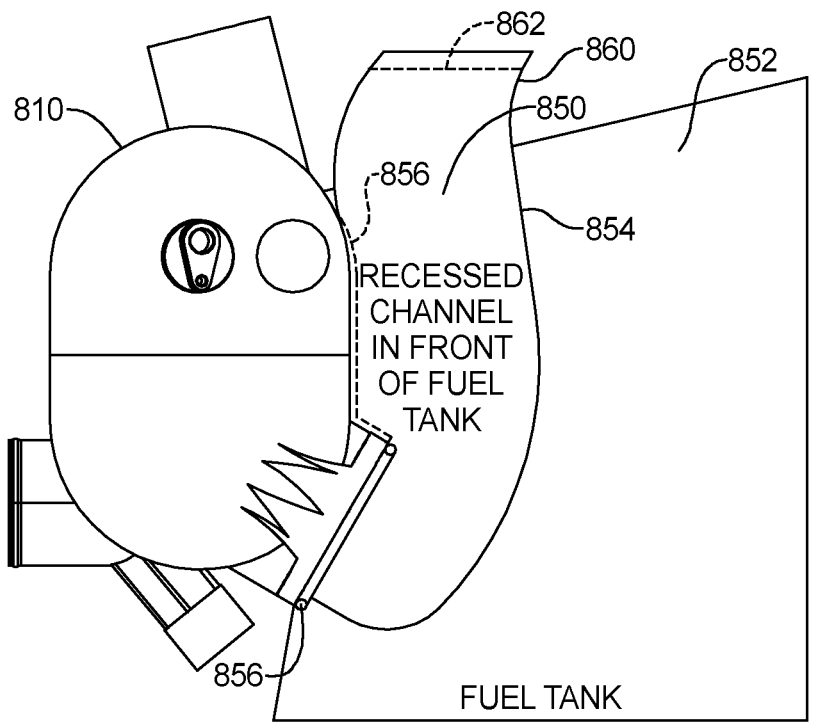

FIG. 8H is a side view of a boost box coupled to a duct.
FIG. 8I is a side view of the boost box coupled to a channel integrally formed with a fuel tank.

Figure 9A:
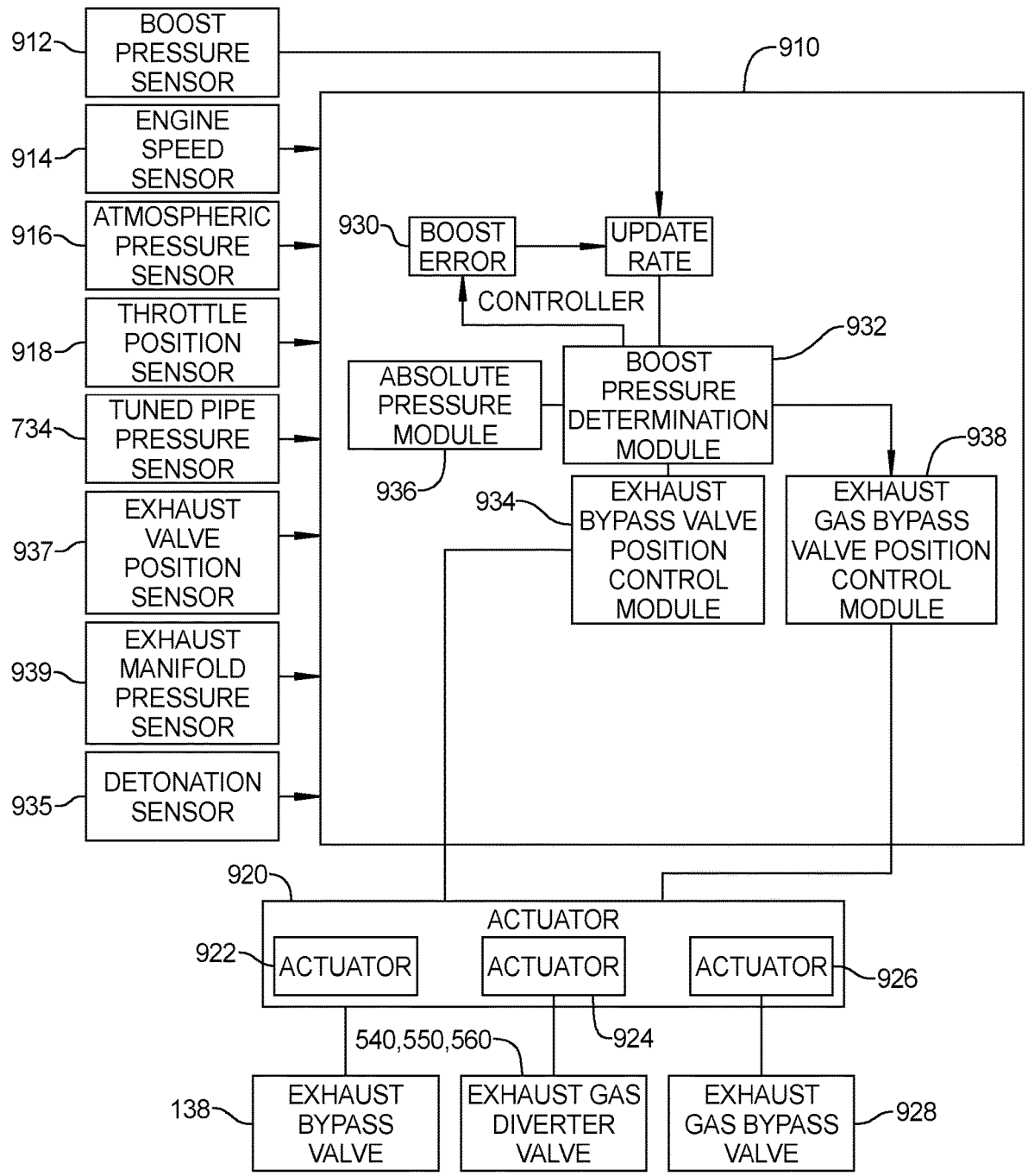

FIG. 9A is a block diagrammatic view of a system for controlling an exhaust bypass valve.

Figure 9B:
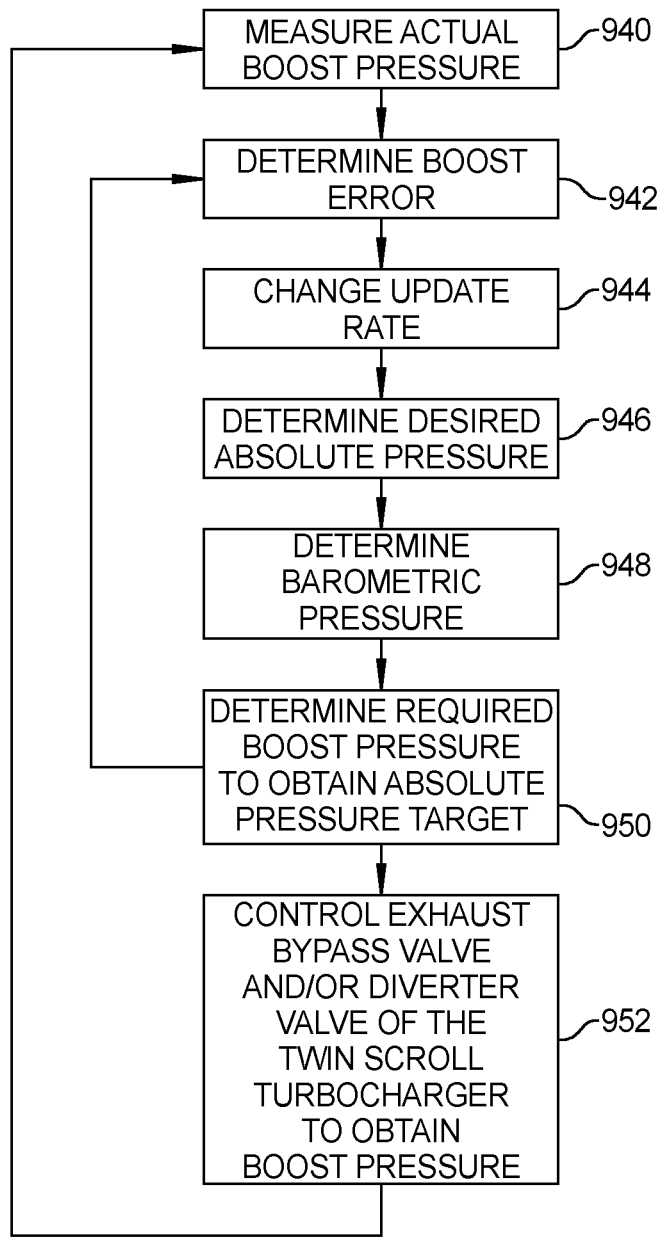

FIG. 9B is a flowchart of a method for controlling the exhaust gas bypass valve.

FIG. 9C is a plot of boost error versus time for a plurality of signals used for updating the exhaust gas bypass valve position.

Figure 9D:
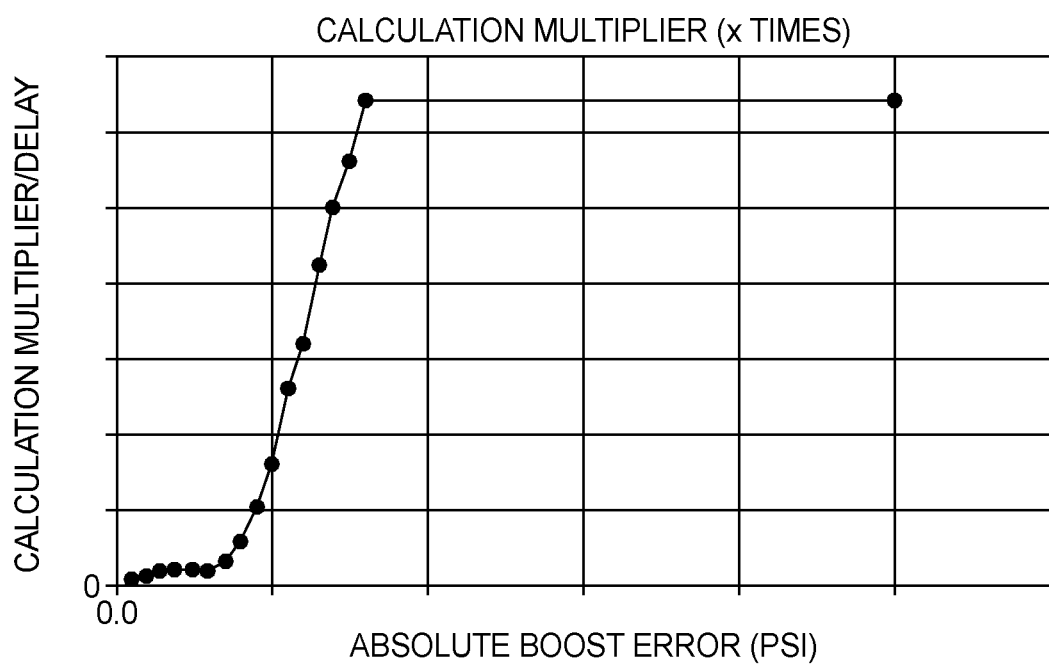

FIG. 9D is a plot of the calculation multiplier versus boost error.

Figure 9E:
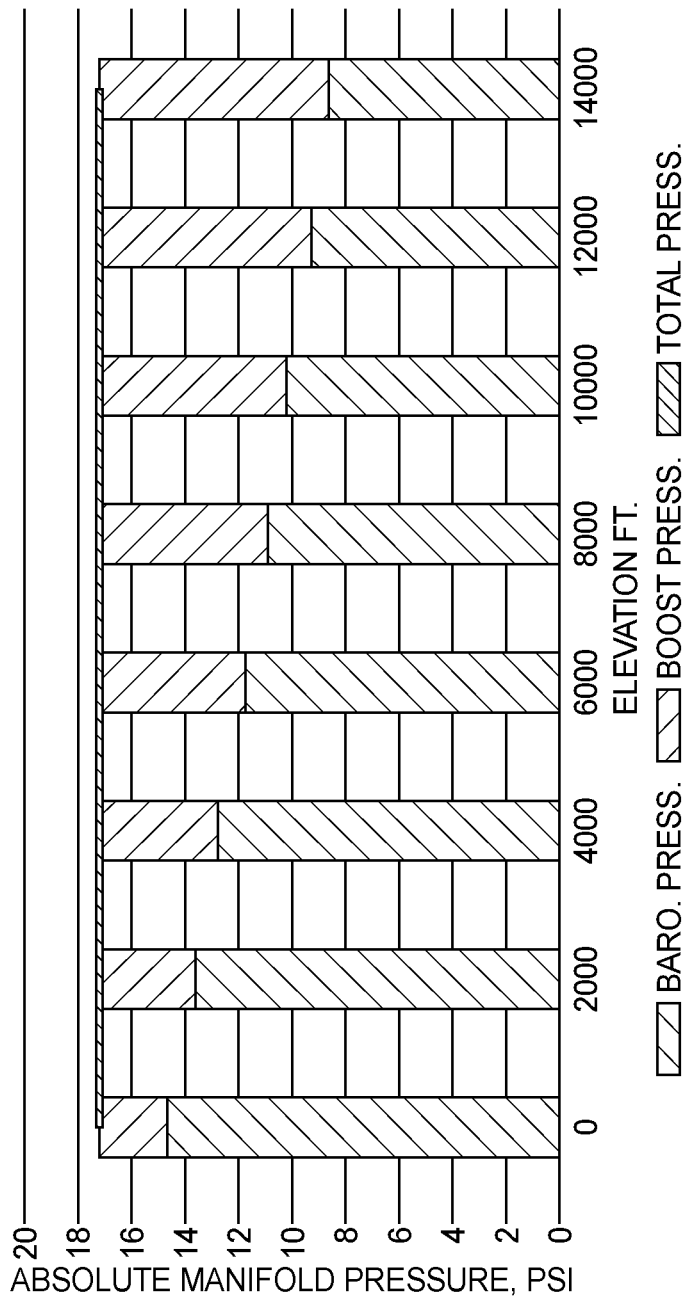

FIG. 9E is a graph illustrating the absolute pressure and changes over various altitudes.

Figure 9F:
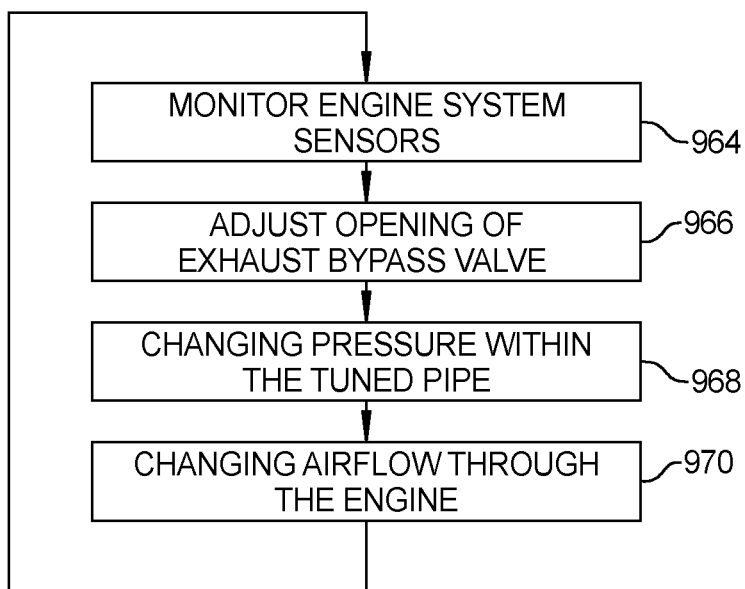

FIG. 9F is a flowchart of a method for controlling an exhaust gas bypass valve to increase power or stability of a two-stroke engine.

Figure 9G:
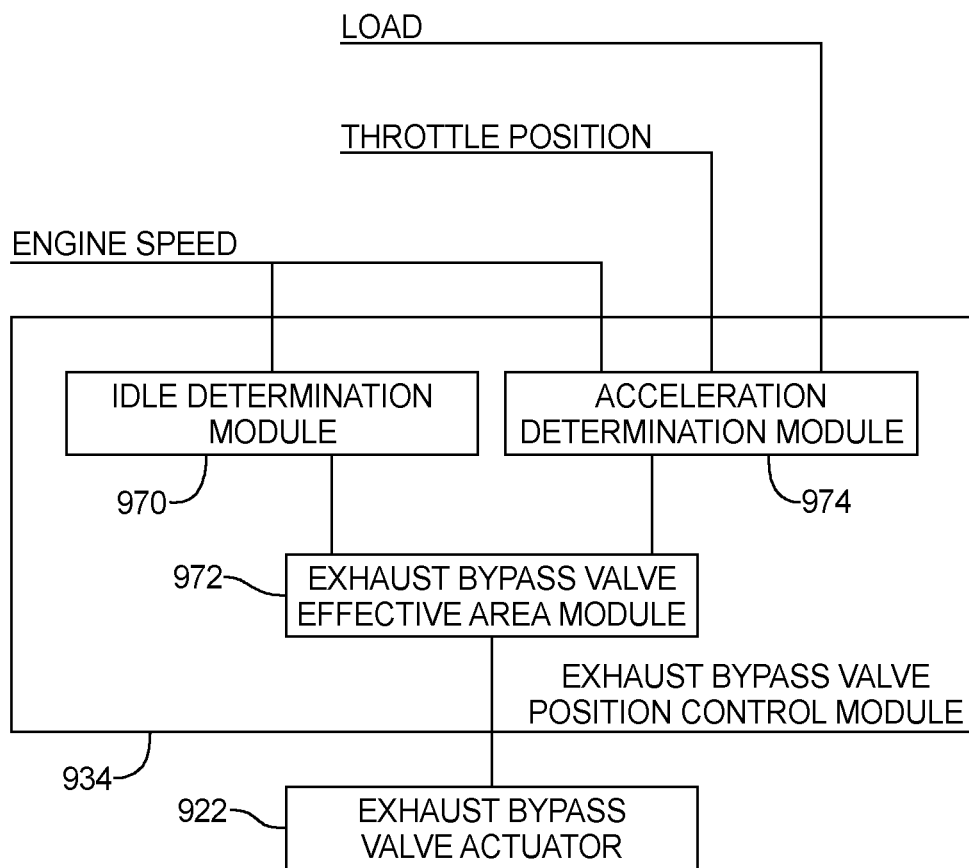

FIG. 9G is a block diagrammatic view of a first example of the exhaust gas bypass valve position control module.

Figure 9H:
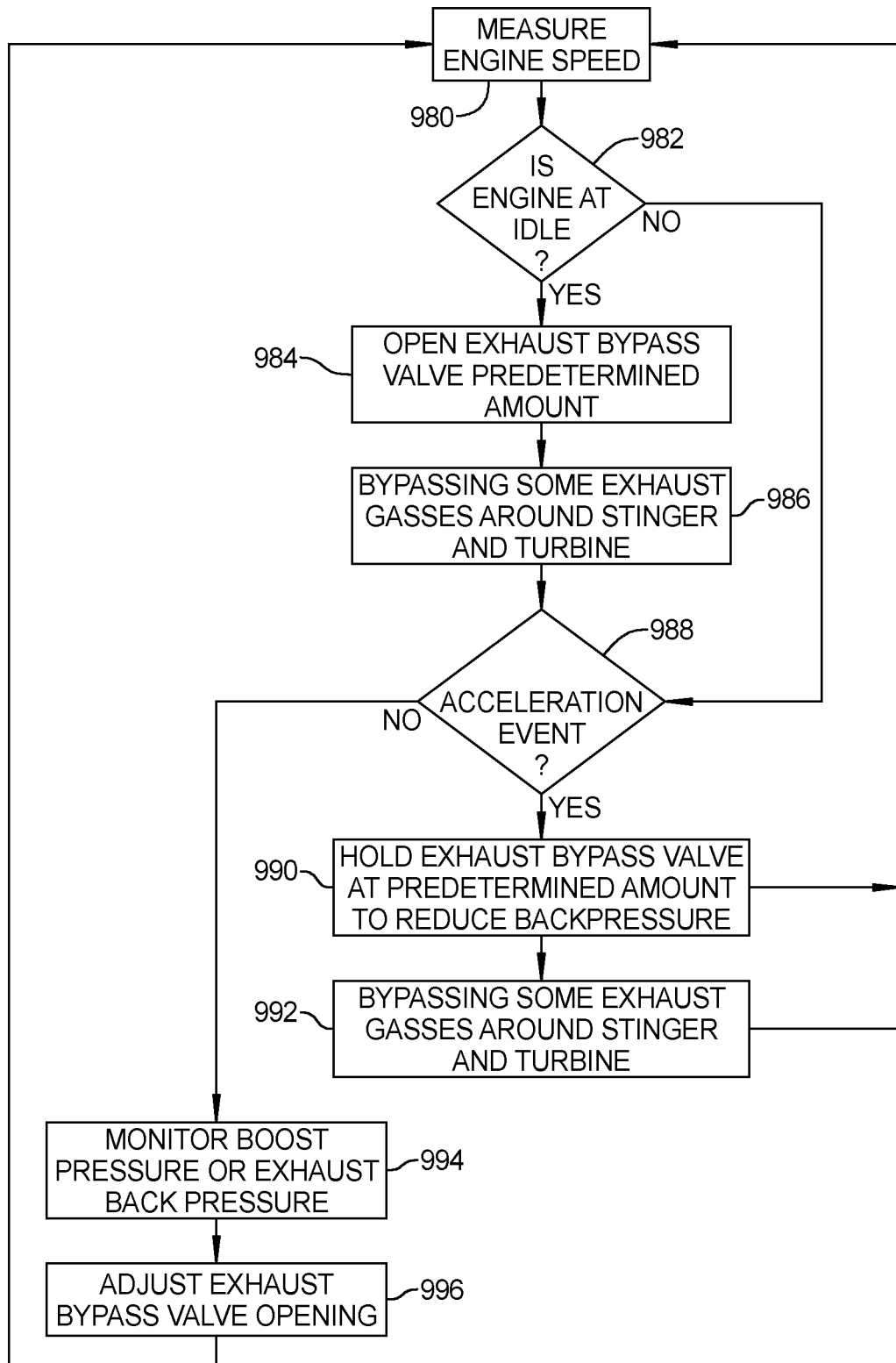

FIG. 9H is a flowchart of a method for operating the exhaust gas bypass valve in response to an idle and acceleration event.

Figure 10A:
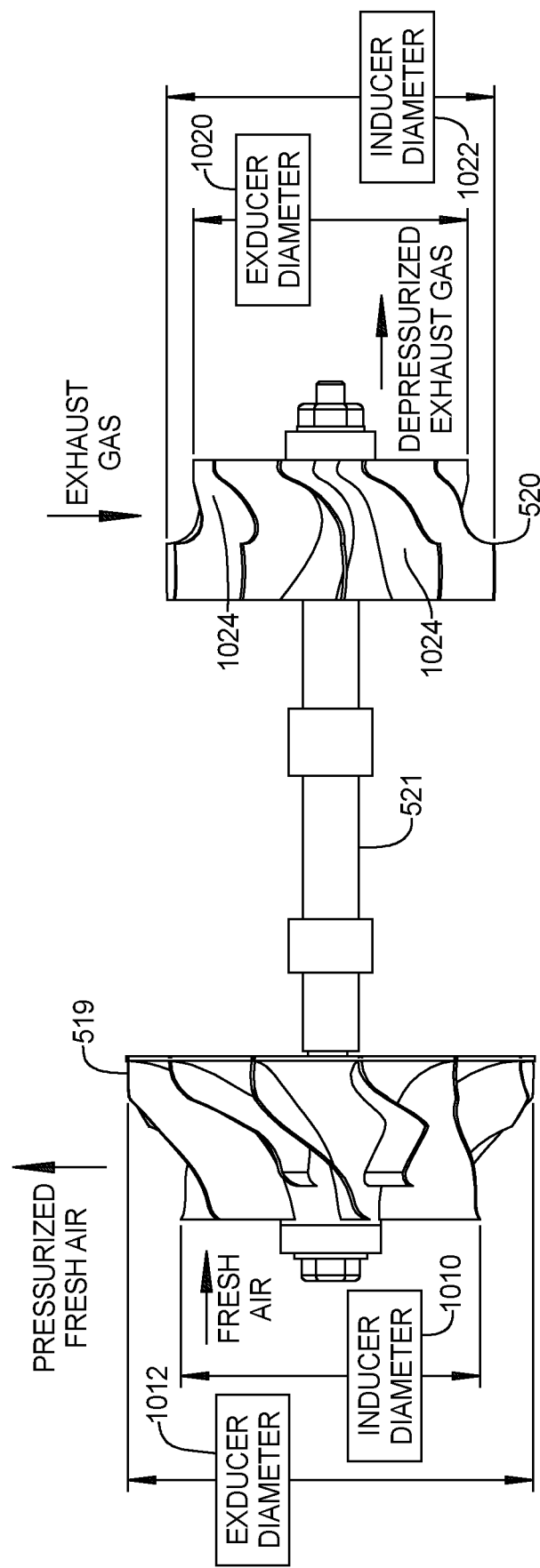
Figure 10B:
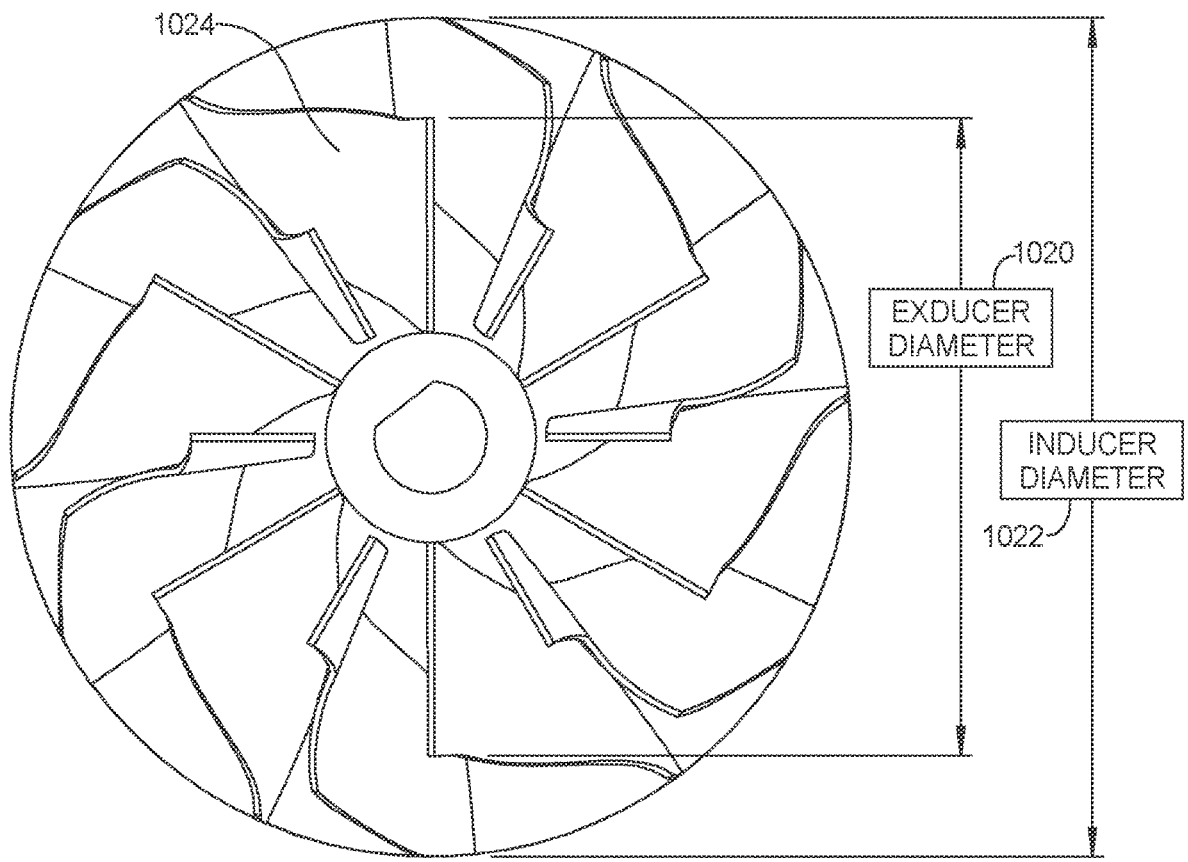
Figure 10C:
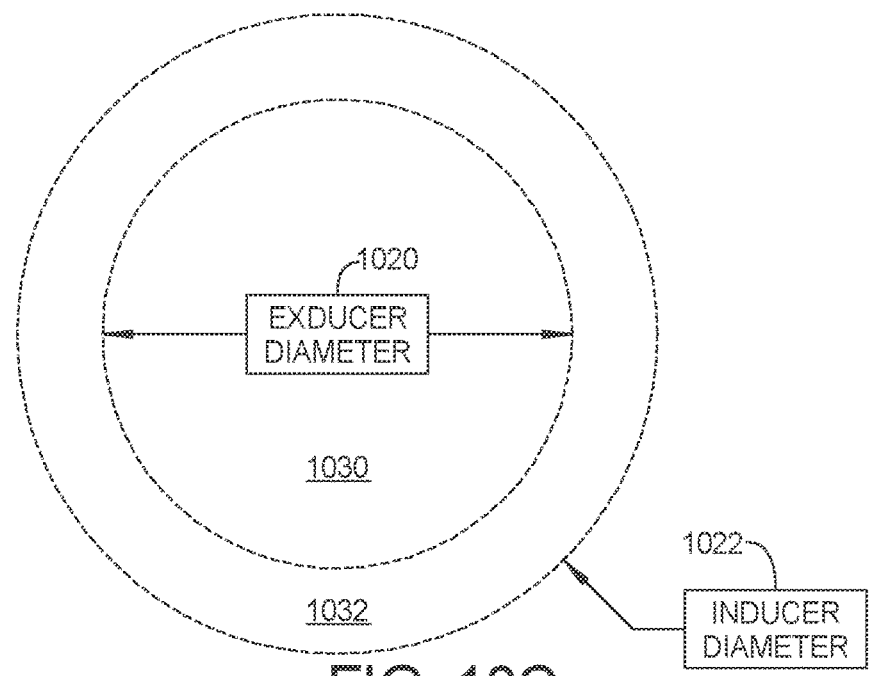

FIG. 10A is a side view of a rotor of a turbocharger.
FIG. 10B is an end view of the rotor of FIG. 10A.
FIG. 10C is a diagrammatic representation of the exducer area.

FIG. 10D is a plot of the ratio of exhaust gas bypass valve or bypass valve area to exducer area for known four stroke engines, two stroke engines and the present example.

DETAILED DESCRIPTION

Examples will now be described more fully with reference to the accompanying drawings. Although the following description includes several examples of a snowmobile application, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings. The signals set forth below refer to electromagnetic signals that communicate data.

Figure 1:
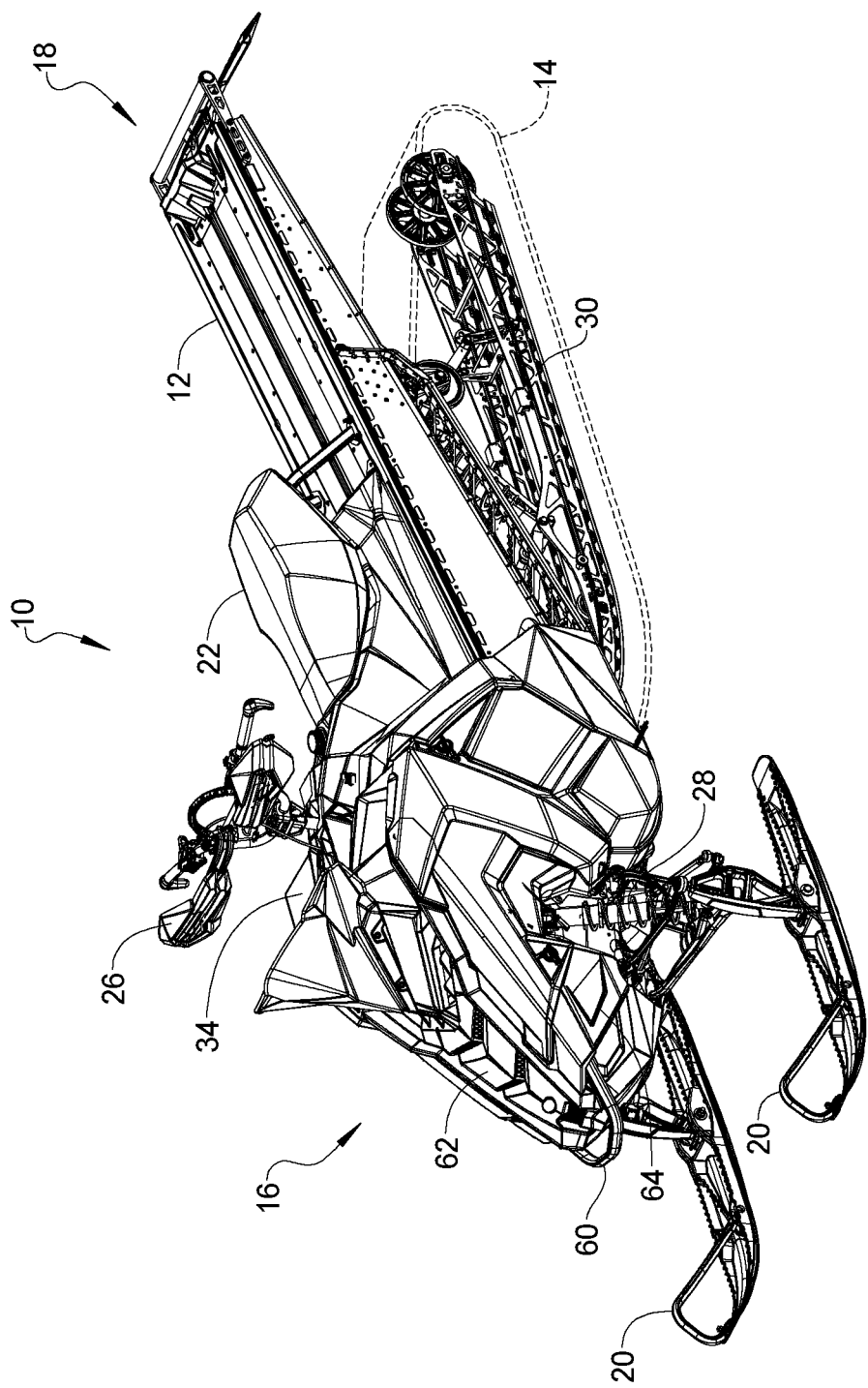
Figure 2:
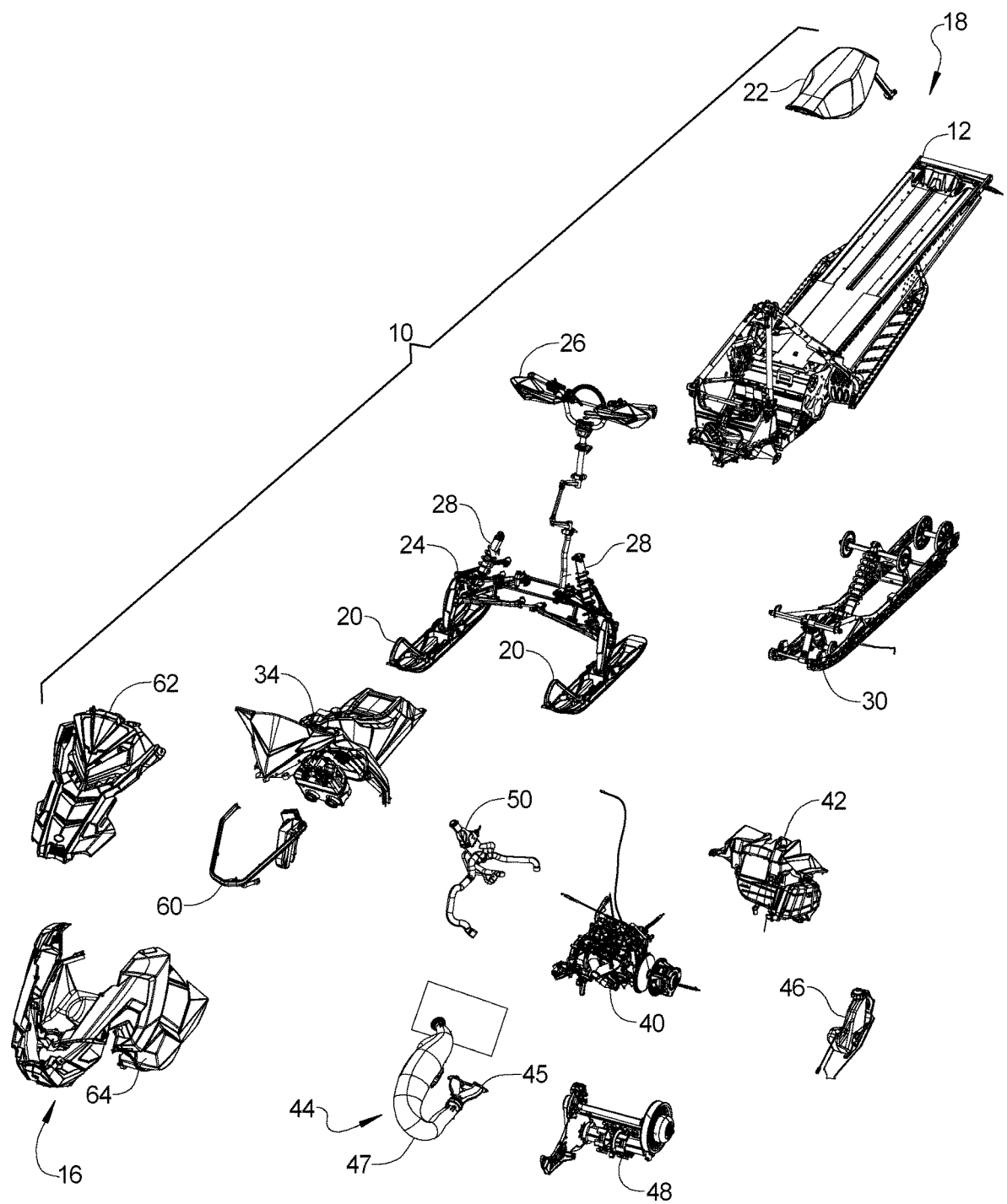
Figure 2A:
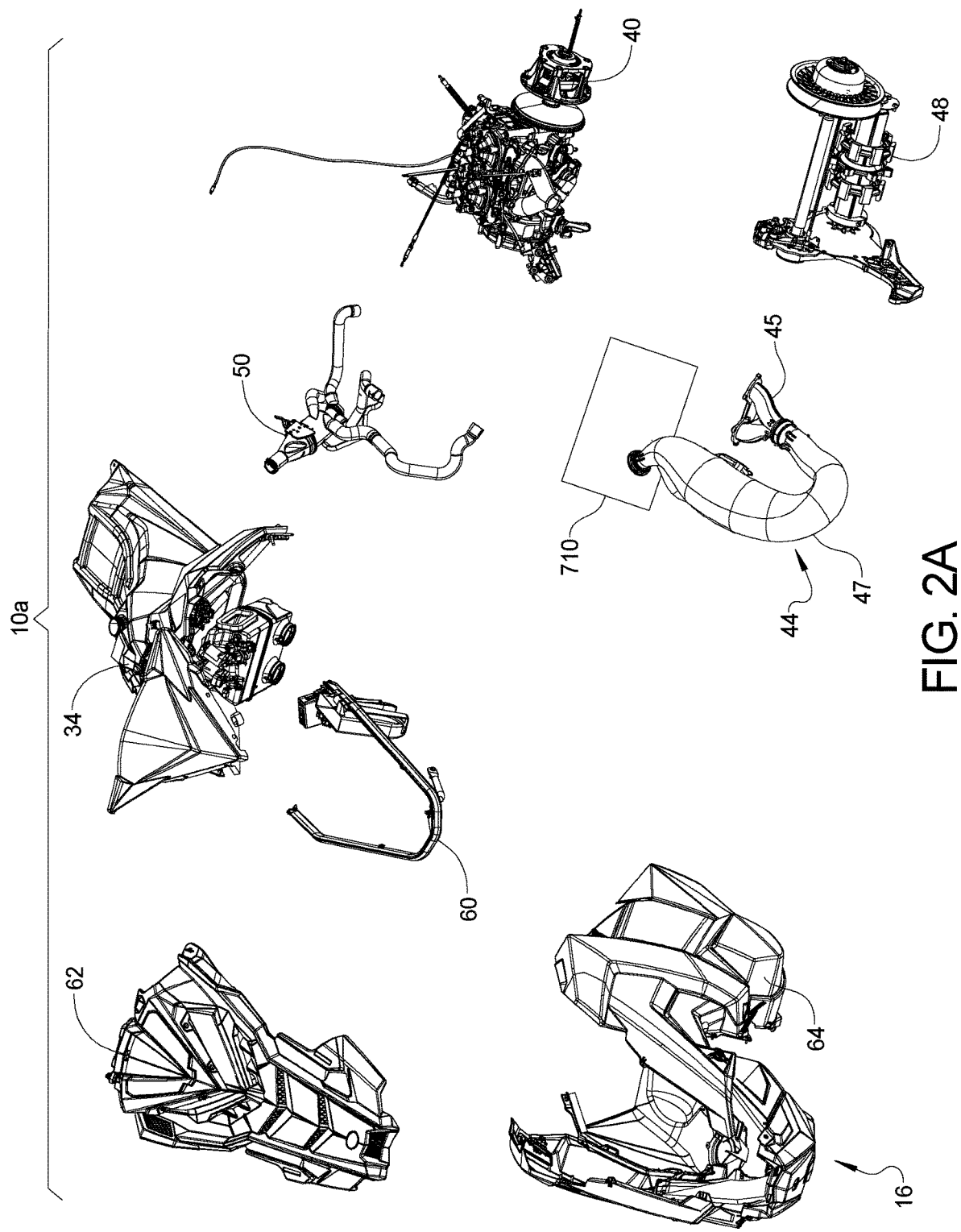
Figure 2B:
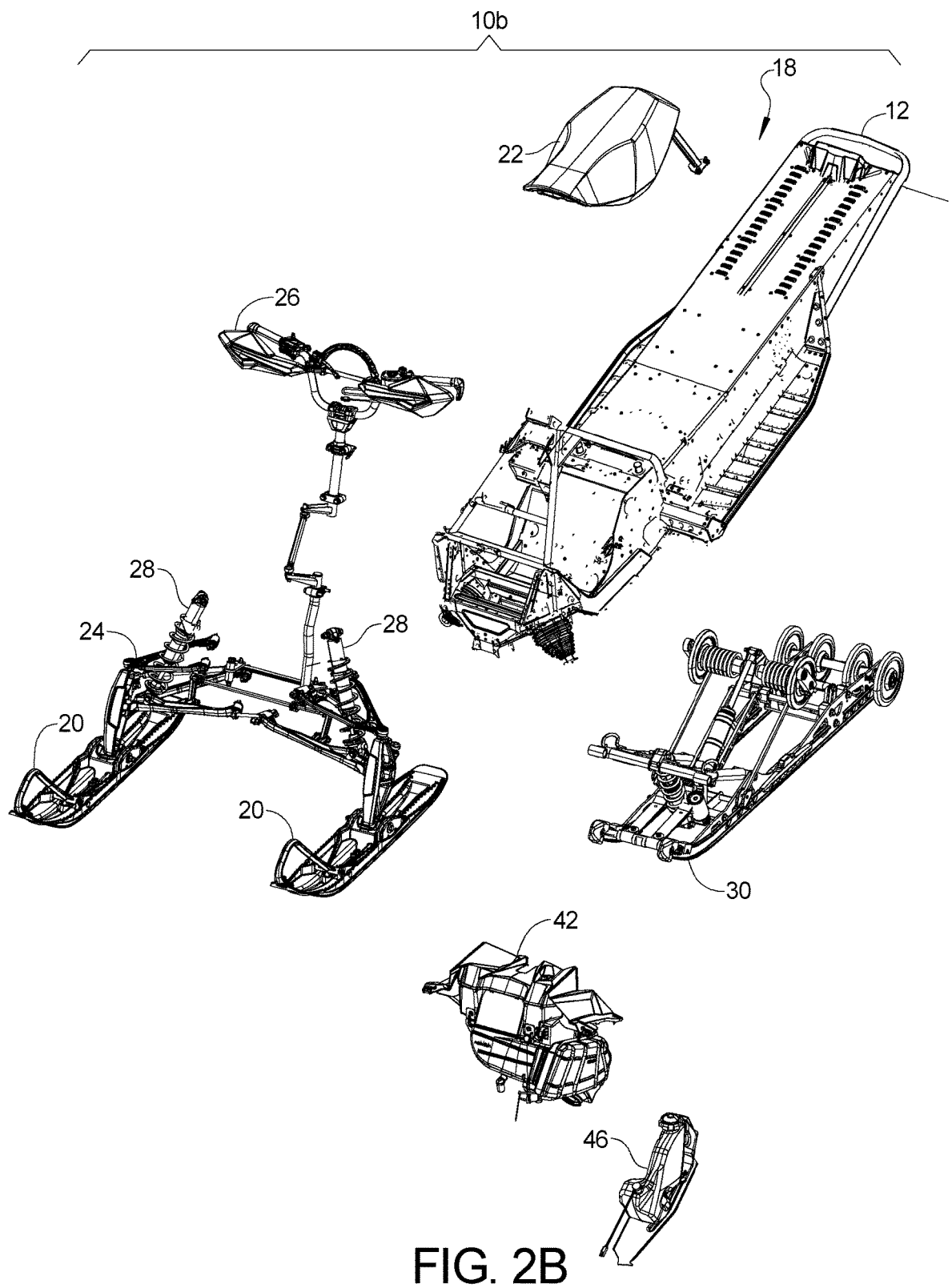

Referring now to FIGS. 1 and 2, one example of an exemplary snowmobile 10 is shown. Snowmobile 10 includes a chassis 12, an endless belt assembly 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include handlebars 26 for steering, shock absorbers 28 and the skis 20. A rear suspension assembly 30 is also coupled to the chassis assembly 12. The rear suspension assembly 30 may be used to support the endless belt 14 for propelling the vehicle. An electrical console assembly 34 is also coupled to the chassis assembly 12. The electrical console assembly 34 may include various components for displaying engine conditions (i.e., gauges) and for electrically controlling the snowmobile 10.

The snowmobile 10 also includes an engine assembly 40. The engine assembly 40 is coupled to an intake assembly 42 and an exhaust assembly 44. The intake assembly 42 is used for providing fuel and air into the engine assembly 40 for the combustion process. Exhaust gas leaves the engine assembly 40 through the exhaust assembly 44. The exhaust assembly 44 includes the exhaust manifold 45 and tuned pipe 47. An oil tank assembly 46 is used for providing oil to the engine for lubrication where it is mixed directly with fuel. In other systems oil and fuel may be mixed in the intake assembly. A drivetrain assembly 48 is used for converting the rotating crankshaft assembly from the engine assembly 40 into a potential force to use the endless belt 14 and thus the snowmobile 10. The engine assembly 40 is also coupled to a cooling assembly 50.

The chassis assembly 12 may also include a bumper assembly 60, a hood assembly 62 and a nose pan assembly 64. The hood assembly 62 is movable to allow access to the engine assembly 40 and its associated components.

Figure 3:
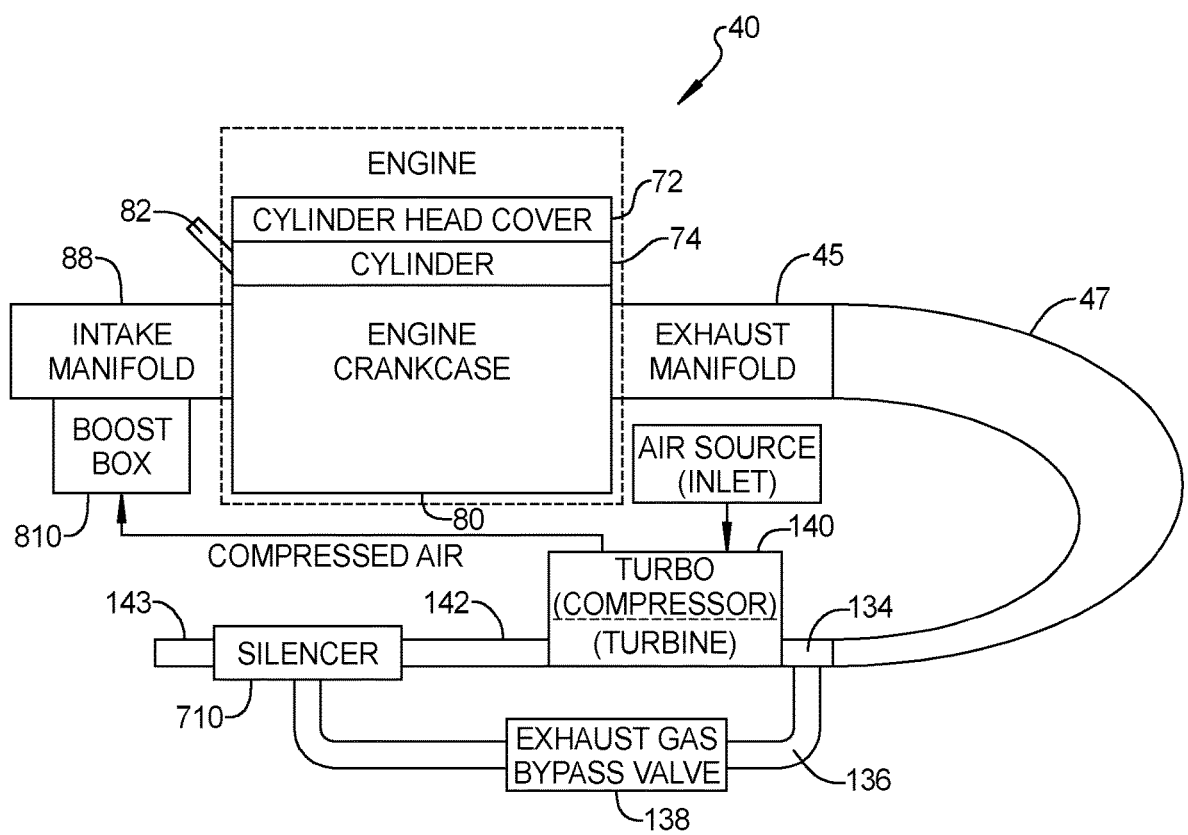
Figure 4:
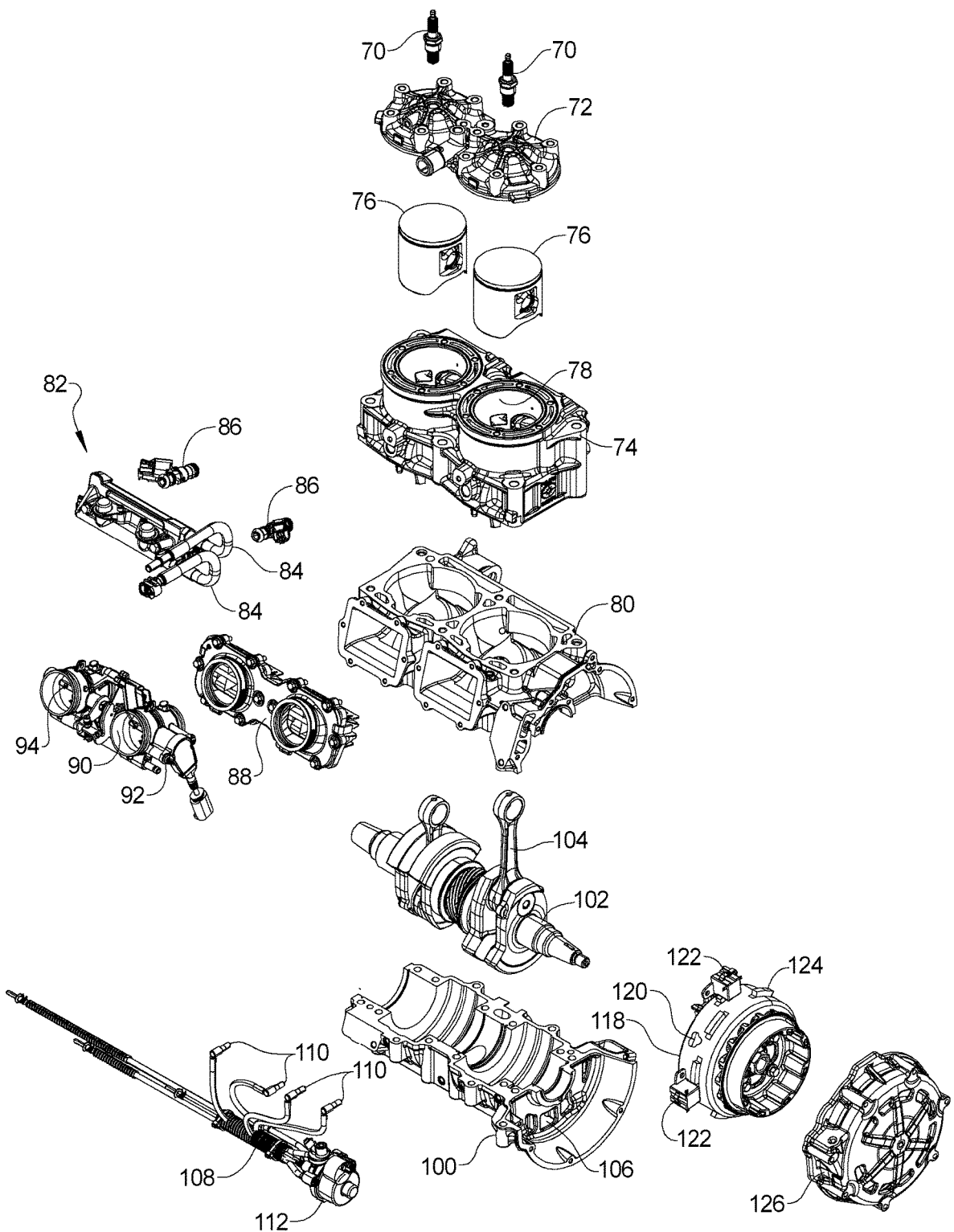

Referring now to FIGS. 3 and 4, the engine assembly 40 is illustrated in further detail. The engine assembly 40 is a two-stroke engine that includes the exhaust assembly 44 that includes an exhaust manifold 45, tuned pipe 47 and exhaust silencer 710.

The engine assembly 40 may include spark plugs 70 which are coupled to a one-piece cylinder head cover 72. The cylinder head cover 72 is coupled to the cylinder 74 with twelve bolts which is used for housing the pistons 76 to form a combustion chamber 78 therein. The cylinder 74 is mounted to the engine upper crankcase 80.

The fuel system 82 that forms part of the engine assembly 40, includes fuel lines 84 and fuel injectors 86. The fuel lines 84 provide fuel to the fuel injectors 86 which inject fuel, in this case, into a port in the cylinder adjacent to the pistons 76. In other cases, an injection may take place adjacent to the piston, into a boost box (detailed below) or into the throttle body. An intake manifold 88 is coupled to the engine upper crankcase 80. The intake manifold 88 is in fluidic communication with the throttle body 90. Air for the combustion processes is admitted into the engine through the throttle body 90 which may be controlled directly through the use of an accelerator pedal or hand operated lever or switch. A throttle position sensor 92 is coupled to the throttle to provide a throttle position signal corresponding to the position of the throttle plate 94 to an engine controller discussed further herein.

The engine upper crankcase 80 is coupled to lower crankcase 100 and forms a cavity for housing the crankshaft 102. The crankshaft 102 has connecting rods 104 which are ultimately coupled to the pistons 76. The movement of the pistons 76 within the combustion chamber 78 causes a rotational movement at the crankshaft 102 by way of the connecting rods 104. The crankcase may have openings or vents 106 therethrough.

The system is lubricated using oil lines 108 which are coupled to the oil injectors 110 and an oil pump 112.

The crankshaft 102 is coupled to a generator flywheel 118 and having a stator 120 therein. The flywheel 118 has crankshaft position sensors 122 that aid in determining the positioning of the crankshaft 102. The crankshaft position sensors 122 are aligned with the teeth 124 and are used when starting the engine, as well as being used to time the operation of the injection of fuel during the combustion process. A stator cover 126 covers the stator 120 and flywheel 118.

Discussed below are various features of the engine assembly 40 used in the snowmobile 10. Each of the features relate to the noted section headings set forth below. It should be noted that each of these features can be employed either individually or in any combination with the engine assembly 40. Moreover, the features discussed below will utilize the reference numerals identified above, when appropriate, or other corresponding reference numerals as needed. Again, as noted above, while the engine assembly 40 is a two-stroke engine that can be used with the snowmobile 10, the engine assembly 40 can be used with any appropriate vehicles and the features discussed below may be applied to four-stroke engine assemblies as well.

The engine assembly 40 also includes an exhaust manifold 45 that directs the exhaust gases from the engine. The exhaust manifold 45 is in fluid communication with a tuned pipe 47. The tuned pipe 47 is specifically shaped to improve the performance and provide the desired feedback to the engine assembly 40. The tuned pipe 47 is in communication with a stinger 134. The tuned pipe 47 has a bypass pipe 136 coupled thereto. The bypass pipe 136 has an exhaust gas bypass valve 138 used for bypassing some or all of the exhaust gases from being directed to a turbocharger 140. Details of the turbocharger 140 are set forth in the following figures.

Referring now to FIGS. 5A-5G, the turbocharger 140 includes a turbine portion 510 and a pump or compressor portion 512. The turbine portion 510 and the compressor portion 512 have a common shaft 521 that extends there between. That is, the rotational movement within the turbine portion 510 caused from the exhaust gases rotate a turbine wheel 520 which in turn rotates the shaft 521 which, in turn, rotates a compressor wheel 519. The compressor portion 512 includes an inlet 514 and an outlet 516. Movement of the compressor wheel 519 causes inlet air from the inlet 514 to be pressurized and output through the outlet 516 of the housing 518.

The turbine portion 510 includes a turbine wheel 520 with housing 522. The housing 522 includes a turbine inlet 524 and a turbine outlet 526. The inlet 524 receives exhaust gas through the tuned pipe 47 and the stinger 134 as illustrated above. The exhaust gases enter the inlet 524 and are divided between a first scroll 528 and a second scroll 530. Of course, more than two scrolls may be implemented in a system. The scrolls 528, 530 may also be referred to as a volute. Essentially the first scroll 528 and the second scroll 530 start off with a wide cross-sectional area and taper to a smaller cross-sectional area near the turbine wheel. The reduction in cross-sectional area increases the velocity of the exhaust gases which in turn increases the speed of the turbine wheel 520. Ultimately, the rotation of the turbine wheel 520 turns the compressor wheel 519 within the compressor portion 512 by way of a common shaft 521. The size of the first scroll 528 and the second scroll 530 may be different. The overall area to radius (A/R) ratio of the scrolls may be different. The first scroll 528 has a first end 528A and a second end 528B and the second scroll has a second first end 530A and a second end 530B. The first ends 528A, 530A are adjacent to the turbine inlet 524. The second ends 528B, 530B are adjacent to the turbine wheel 520 within the housing 522. The volume of the first scroll 528 and second scroll 530 may be different. The cross-sectional opening adjacent to the turbine wheel 520 may be different between the scrolls.

The first scroll 528 and the second scroll 530 are separated by a separation wall 532. The separation wall 532 separates the first scroll 528 from the second scroll 530. The separation wall 532 may extend from the first end 528A of the first scroll 528 and the first end 530A of the second scroll 530 to the second end 528B, 530B of the respective scrolls.

The turbine portion 510 includes an exhaust gas diverter valve 540 mounted adjacent to the separation wall 532. The exhaust gas diverter valve 540 is used to selectively partially or fully close off either the first scroll 528 or the second scroll 530. A valve seat 542A is located adjacent to the first scroll 528. A second valve seat 542B is located adjacent to the second scroll 530. Either one of the valve seats 542A, 542B receive the exhaust gas diverter valve 540 when the exhaust gas diverter valve 540 is in a completely closed position. The valve seats 542A, 542B may be recesses or grooves that are formed within the housing 522. The valve seats 542A, 542B form a surface that receives an edge 541 of the exhaust gas diverter valve 540 so that when exhaust gases push the exhaust gas diverter valve 540 into the scroll outer wall, the valve seats 542A, 542B provide a counter force. The edge 541 is the end of the valve 540 opposite a pivot pin 544. The valve seats 542A, 542B may be circumferentially formed within each of the first scroll 528 and the second scroll 530. The seal between the valve 540 may be on the edge 541 or on the surface of the valve 540 on each side of the edges 541.

Figure 5A:
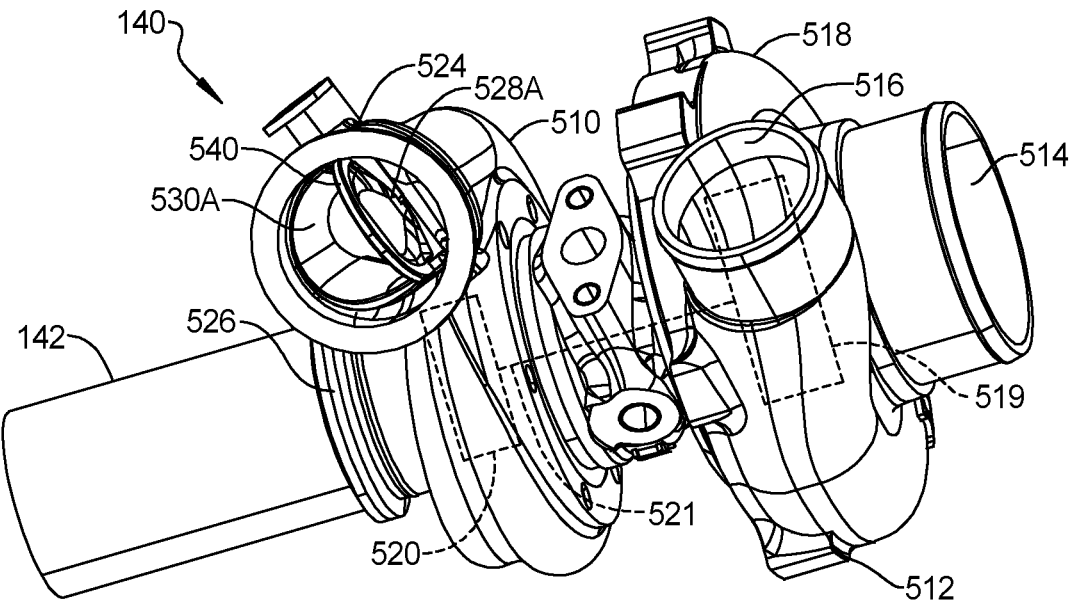
Figure 5B:
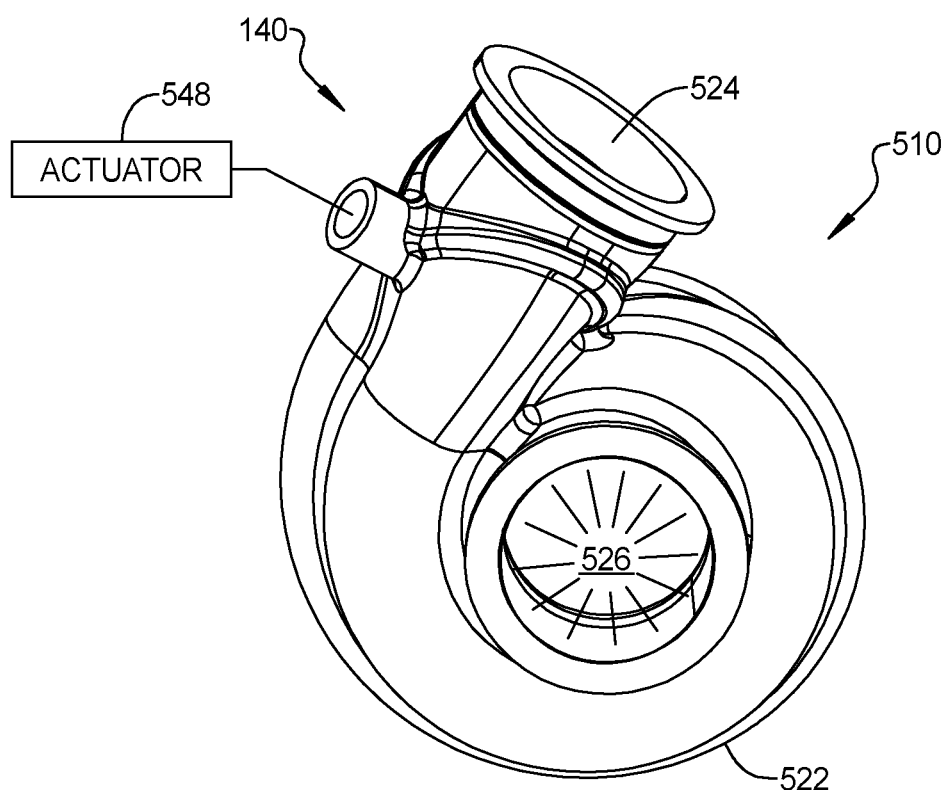
Figure 5C:
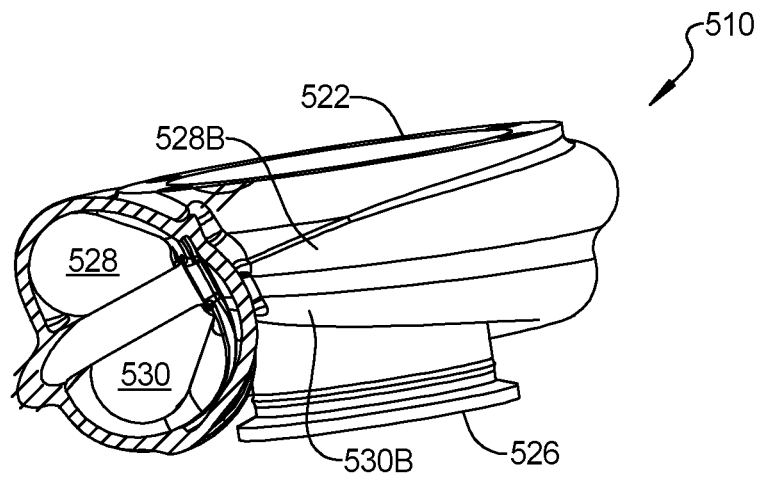
Figure 5D:
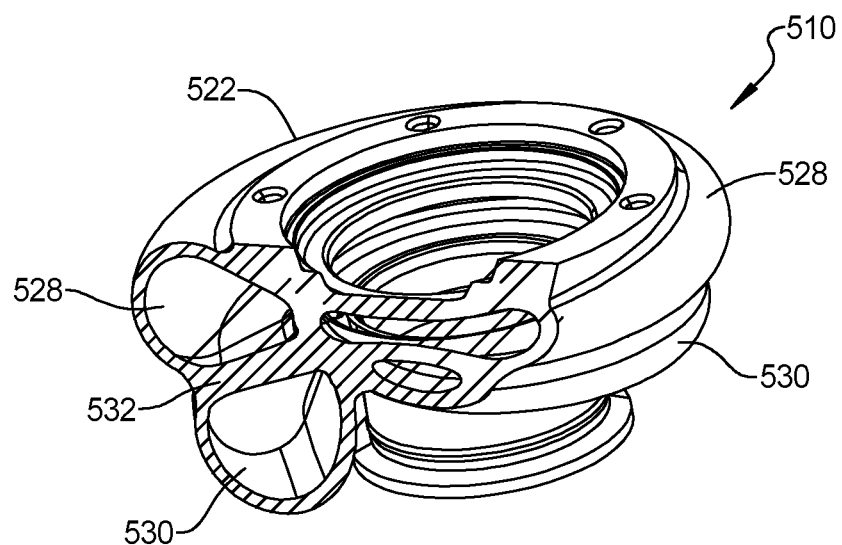
Figure 5E:
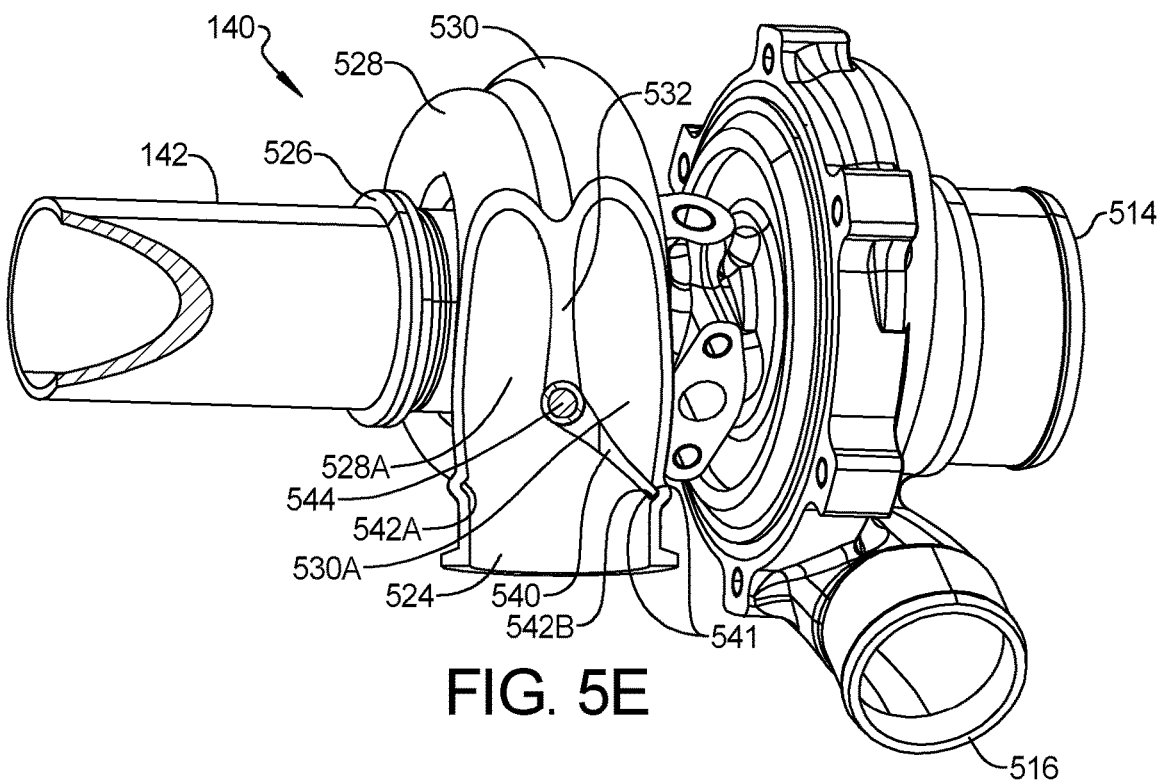
Figure 5F:
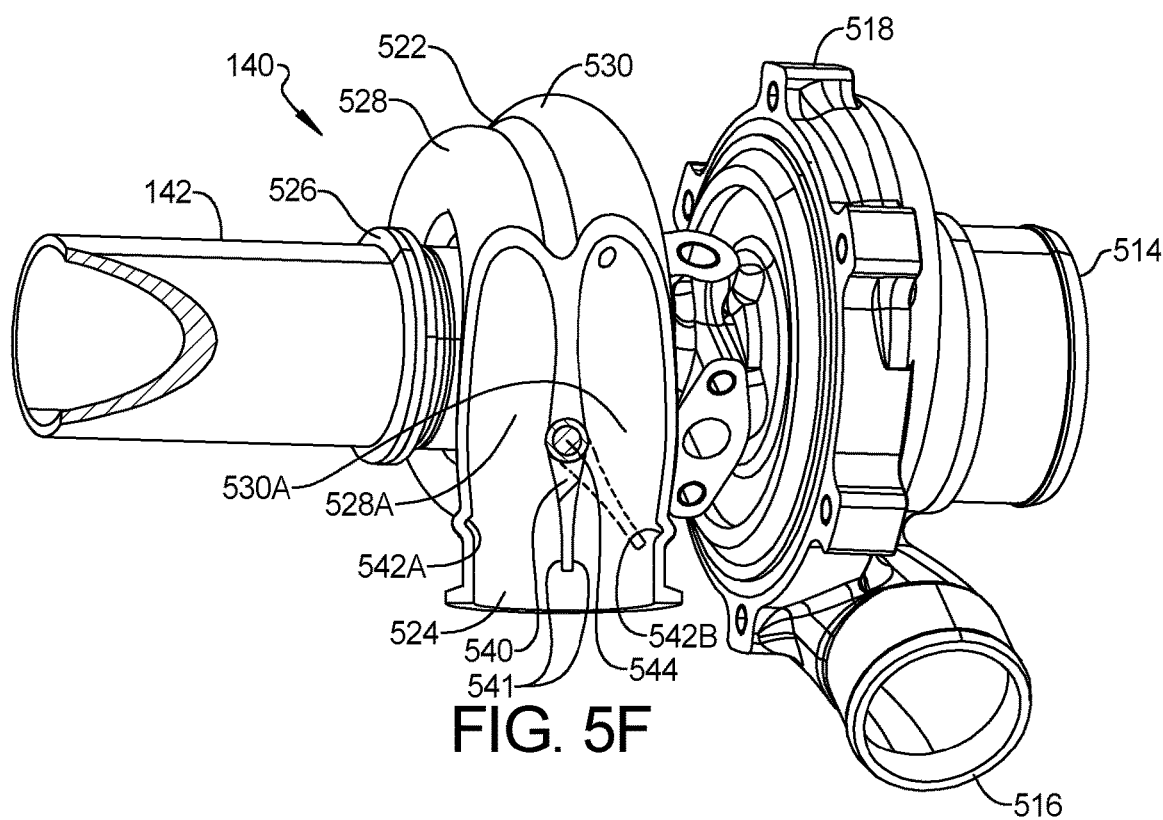
Figure 5G:
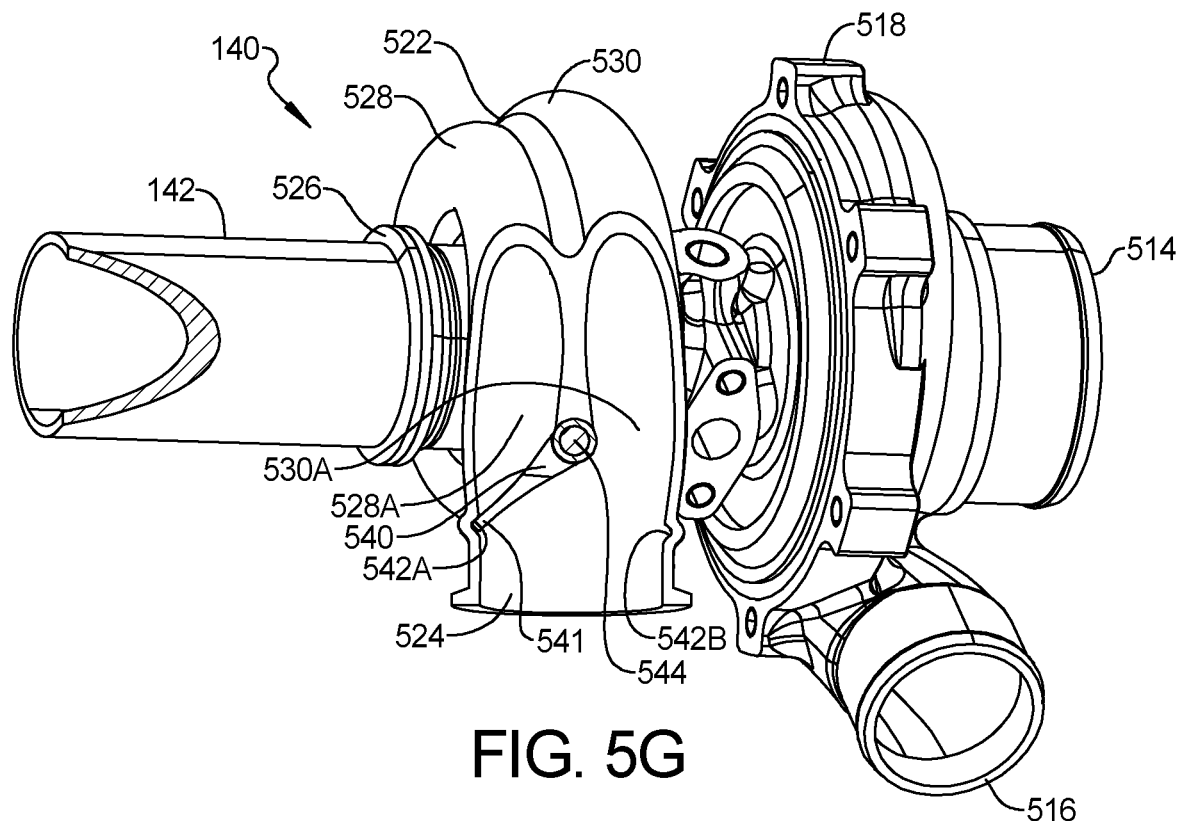

The pivot pin 544 which extends across the turbine inlet 524 to selectively separate or close off the first scroll 528 or the second scroll 530. A partial closing of either the first scroll 528 or the second scroll 530 may also be performed by the exhaust gas diverter valve 540. The exhaust gas diverter valve 540 pivots about the pivot pin 544. As is best shown in FIG. 5B, an actuator 548 such as a motor or a hydraulic actuator may be coupled to the exhaust gas diverter valve 540. Other types of actuators include pneumatic actuator. The actuator 548 moves the exhaust gas diverter valve to the desired position in response to various inputs as will be described in more detail below. That is, there may be conditions where both scrolls may be fully opened, or one or the other scroll may be opened, at least partially. The opening and closing of the valve may be used to control the pressure in the tuned pipe. Further, one scroll may be partially closed using the exhaust gas diverter valve 540 while one scroll may be fully open as indicated by the dotted lines. That is, in FIG. 5E the scroll 530 is completely closed by the edge 541 of the exhaust gas diverter valve 540 being received within the valve seat 542B. In FIG. 5F the exhaust gas diverter valve 540 is in a middle or neutral position in which the first scroll 528 and the second scroll 530 are fully opened. That is, the valve is in a fully opened position and is coincident to or parallel with the separation wall 532. In FIG. 5G the edge 541 of the exhaust gas diverter valve 540 is received within and rests against the valve seat 542A to fully close the first scroll 528.

Figure 5H:
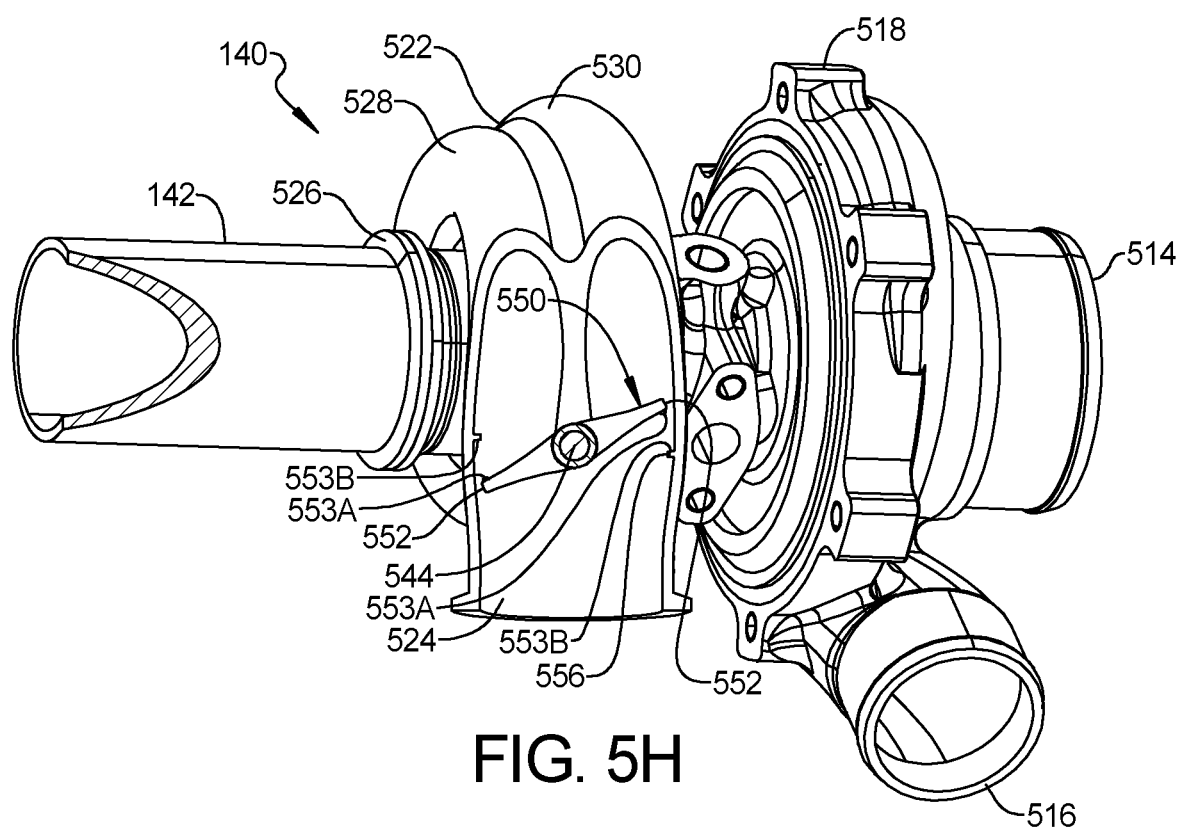
Figure 5I:
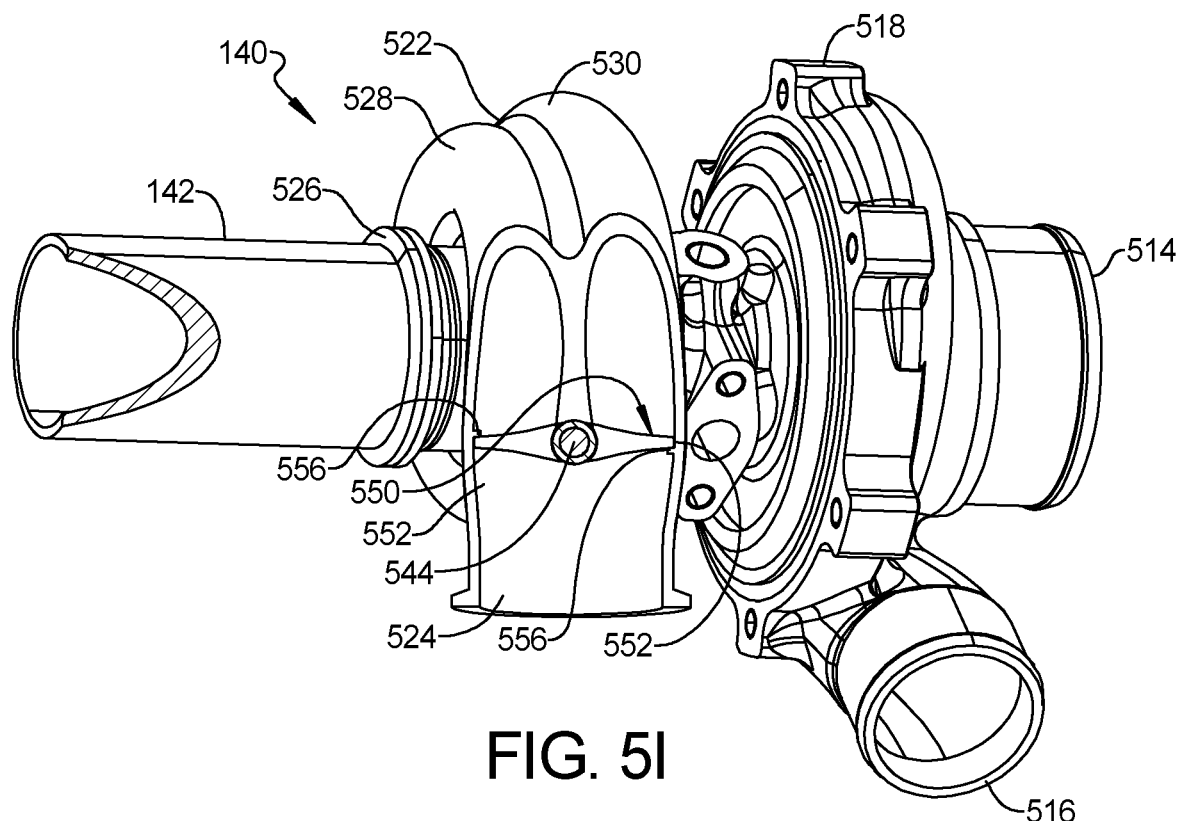

Referring now to FIGS. 5H and 5I, a butterfly type valve 550 may be used in place of the diverter valve 540. The butterfly valve 550 pivots about pivot pin 544. The edge 552 of the valve 550 rests against the valve seat 556 in a closed position (FIG. 5I). The closure may result in a seal or a near closure if a protrusion 553A is on the edge 552 of valve or bump 553B on the seat 556. A dotted protrusion 553B is shown on the edges 552 and valve seat 556. The valve 550 may be in communication with an actuator and motor (or hydraulic actuator or a pneumatic actuator) to move the valve 550 into the desired position. In this manner the valve 550 is more balanced with respect to exhaust gas acting on the valve blade than the diverter valve 540.

Figure 5J:
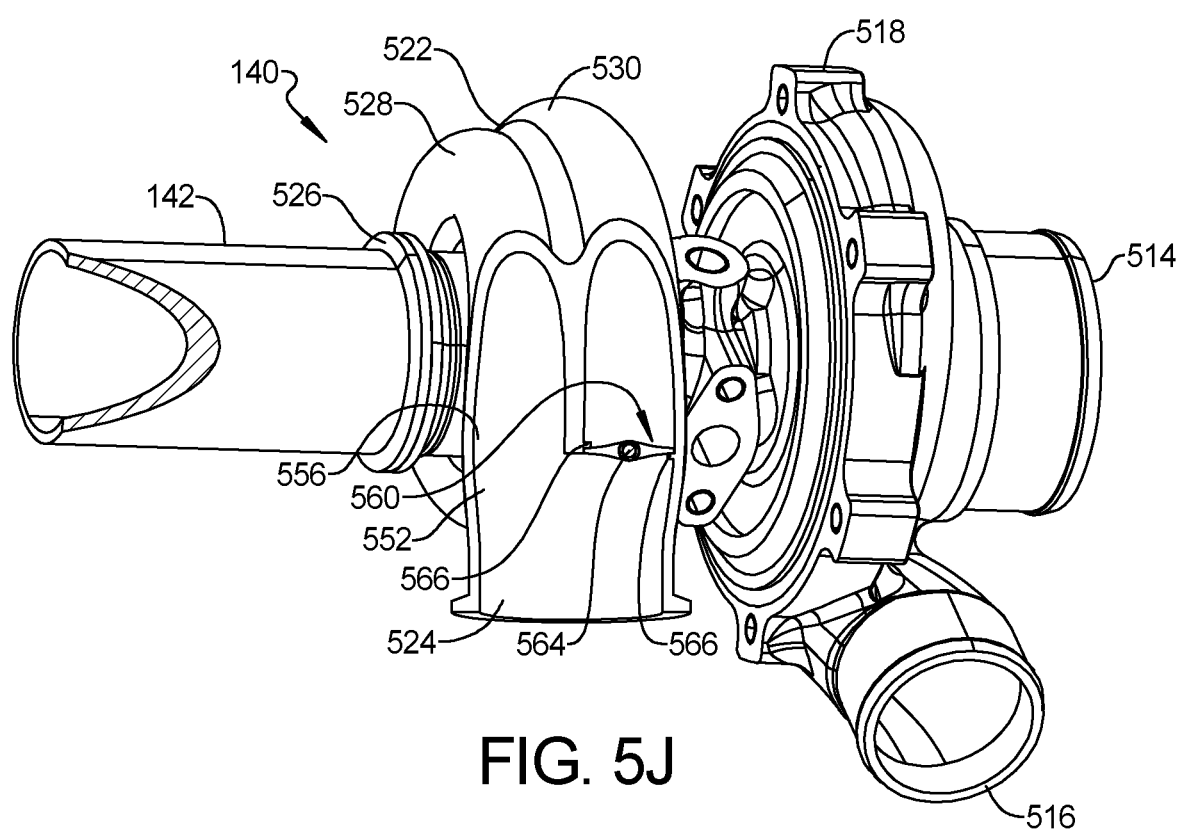

Referring now to FIGS. 5J and 5K, alternate configuration for a butterfly type valve 560 may be used in place of the diverter valves 540 and 550. The butterfly valve 560 is disposed within one of the scrolls. In this example scroll 530 has the first butterfly type valve 560. The butterfly valve 560 pivots about pivot pin 564. The edge 562 of the valve 560 rests against the valve seat 566 in a closed position (FIG. 5J). The valve 560 may be in communication with an actuator and motor (or hydraulic actuator or a pneumatic actuator) to move the valve 560 into the desired position. In this manner, the valve 560 is more balanced with respect to exhaust gas acting on the valve blade than the diverter valve 540.

In any of the examples in FIGS. 5A-5K, the valve 550 may also be made oval. The closed position may be less than 90 degrees. The closure may not be air tight intentionally. In addition, any of FIGS. 5A-5K may have the protrusions 553A and/or 553B.

Referring now to FIGS. 6A-6F, an exhaust gas bypass valve 138 is set forth. By way of example, for a turbocharged engine the exhaust gas bypass valve 138 may be implemented in a wastegate. The exhaust gas bypass valve 138 may be configured in the bypass pipe 136 that connects the exhaust gas from the exhaust manifold 45 and the tuned pipe 47 to an exhaust pipe 142 coupled to the outlet of the turbine portion of the turbocharger. Of course, as detailed below, the exhaust gas bypass valve 138 may be used in various positions within the exhaust assembly 44.

The exhaust gas bypass valve 138 has an exhaust gas bypass valve housing 610. The exhaust gas bypass valve housing 610 may have a first flange 612A and a second flange 612B. The flanges 612A, 612B are used for coupling the exhaust gas bypass valve to the respective portions of the bypass pipe 136A, 136B. Of course, direct welding to the tuned pipe or bypass piping may be performed. The housing 610 has an outer wall 611 that is generally cylindrical in shape and has a longitudinal axis 613 which also corresponds to the general direction of flow through the exhaust gas bypass valve housing 610. The outer wall 611 has a thickness T1.

The housing 610 includes a valve member 614 that rotates about a rotation axis 616. The rotation axis 616 coincides with an axle 618 that is coupled to the housing 610 so that the valve member 614 rotates thereabout in a direction illustrated by the arrow 620. The valve member 614 is balanced to minimize the operating torque required to open/close the valve member 614. The butterfly arrangement has exhaust gas working on both sides of the valve member 614, which effectively causes the forces to counteract and 'cancel' each other that results in a significantly reduced operating torque. Consequently, the valve member 614 may be sized as wastegate as big as necessary without significantly increasing the operating torque to actuate it. Advantageously a smaller (and likely less expensive) actuator may be utilized.

The housing 610 may include a first valve seat 622 and a second valve seat 624. The seats 622 and 624 are integrally formed with the housing. As is illustrated, the valve seats 622 and 624 are thicker portions of the housing. The valve seats 622, 624 may have a thickness T2 greater than T1. Of course, casting thicknesses may change such as by providing pockets of reduced thickness for weight saving purposes. The valves seats 622, 624 are circumferential about or within the housing 610. However, each of the valve seats 622 and 624 extends about half way around the interior of the housing to accommodate the axle 618.

The valve seats 622, 624 have opposing surfaces 626, 628 that have a planar surface that are parallel to each other. The surfaces 626, 628 contact opposite sides of the valve member 614 in the closed position. This allows the valve member 614 to rest against each valve seat 622, 624 to provide a seal in the closed position. The exhaust gas bypass valve 138 and the valve member 614 therein move in response to movement of an actuator 630. The actuator 630 rotates the valve member 614 about the axis 616 to provide the valve member 614 in an open and a closed position. Of course, various positions between open and closed are available by positioning the actuator 630. As will be further described below, the actuator 630 may actuate the valve member 614, exhaust gas diverter valve 540 and valves 550, 560 as described above. As mention above the surface area of the valve member 614 is the same above and below the axis 616 so that the operating toque is minimized due to the exhaust gas load being distributed evenly on both sides of the axis 616.

The effective cross-sectional area of opening, passage or port P1 available to the exhaust gasses flowing through the interior of the exhaust gas bypass valve is limited by the distance T2 and the valve member 616 and axle 616. After experimentation, it was found that the effective cross-sectional area of the exhaust gas bypass valve 138 may be formed as a function of an exducer of the turbine wheel 520 as is described in greater detail below.

To vary the effective area, the valve member 614 of the exhaust gas bypass valve 138 has different angles $\alpha_1$-$\alpha_4$ illustrated in FIGS. 6B to 6E respectively. The angles $\alpha_1$-$\alpha_4$ progressively increase. The angular opening corresponds directly with the effective area of the exhaust gas bypass valve 138. The angular opening of the exhaust gas bypass valve 138 may be controlled in various ways or in response to various conditions. Although specific angles are illustrated, the exhaust gas bypass valve 138 is infinitely variable between the fully closed position of FIG. 6A and the fully open position of FIG. 6E.

Figure 6C:
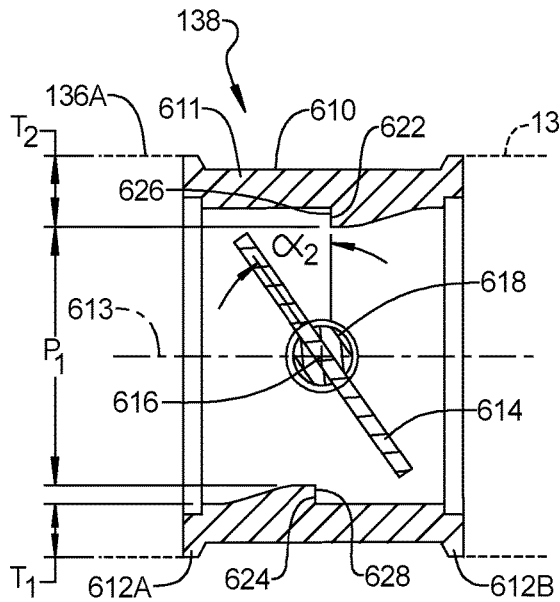
Figure 6D:
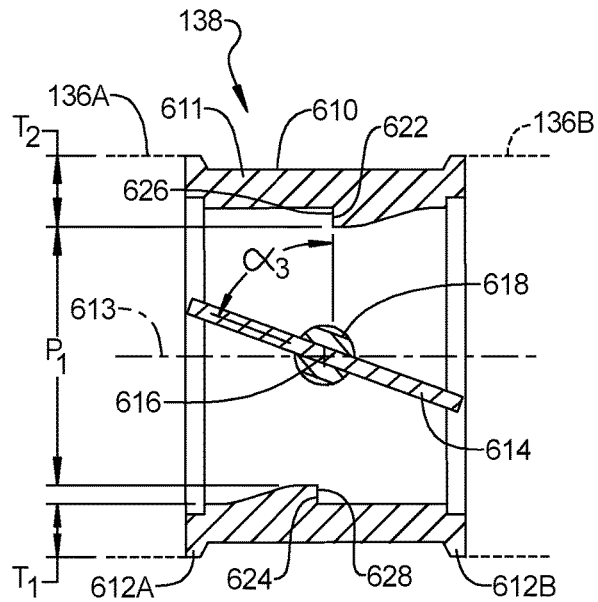
Figure 6E:
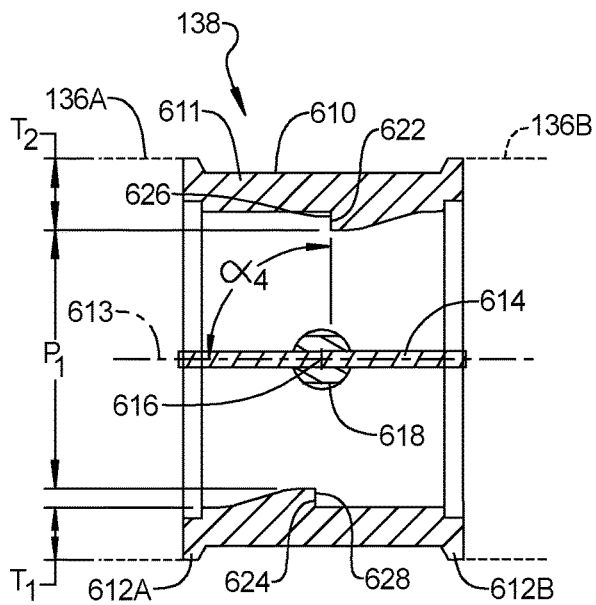
Figure 6F:
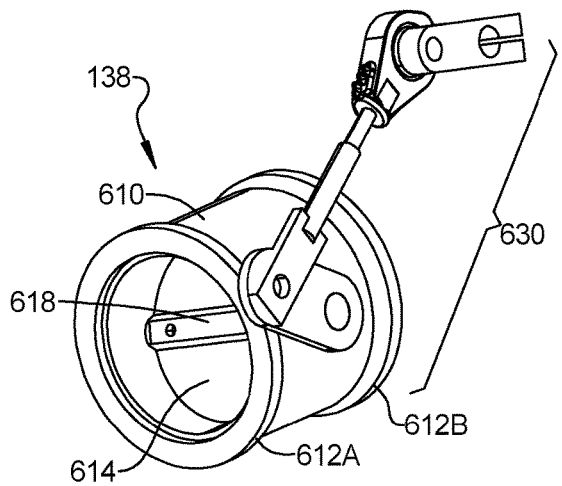
Figure 6G:
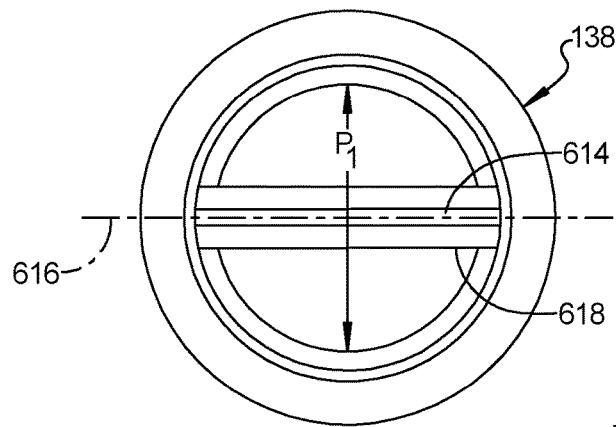

Referring now to FIG. 6G, and end view of the exhaust gas bypass valve 138 is illustrated in the open position corresponding to FIG. 6E.

Figure 6H:
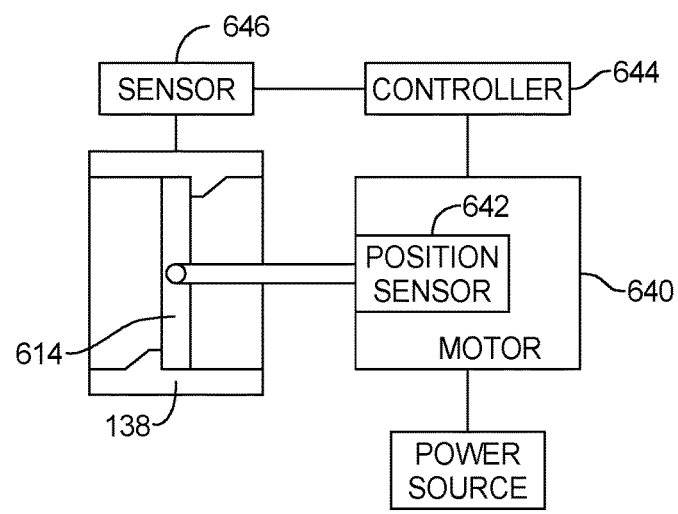

Referring now to FIG. 6H, the exhaust gas bypass valve 138 may be in communication with an electrical motor 640. The electrical motor 640 has a position sensor 642 that provides feedback to a controller 644. The controller 644 is coupled to a plurality of sensors 646. The sensors provide feedback to the controller 644 to control the position of the valve 614 of the exhaust gas bypass valve 138. The sensors 646 may include a boost pressure sensor, tuned pipe pressure sensor, exhaust manifold pressure sensor and a barometric pressure sensor. Other types of sensors that may be used for controlling the motor may include various types of temperature and pressure sensors for different locations within the vehicle.

Figure 6I:
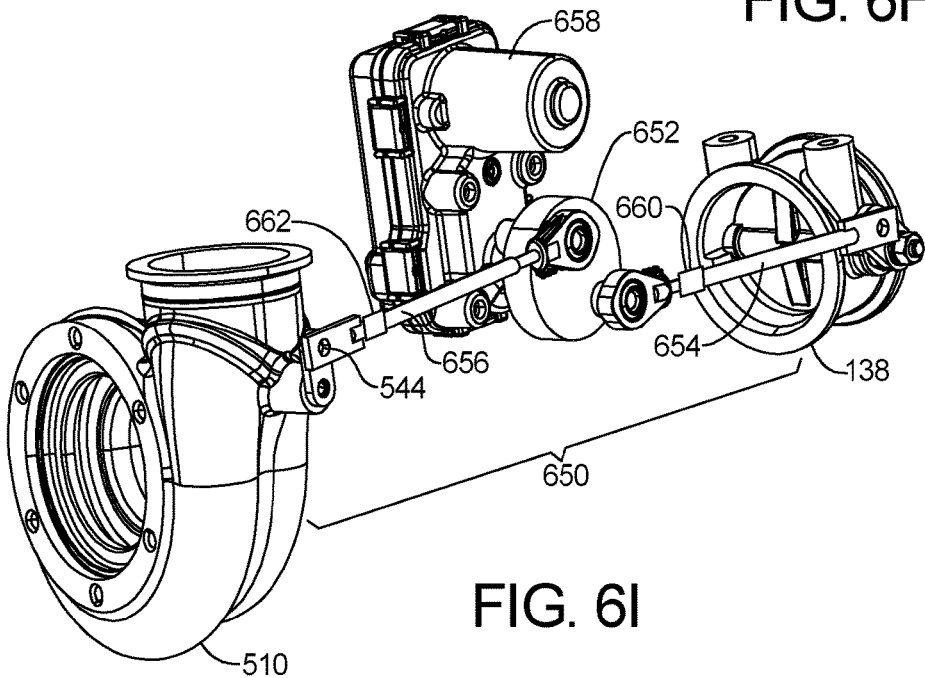

Referring now to FIG. 6I, the turbine portion 510 is shown in relation to an exhaust gas bypass valve 138. In this example, a dual actuation system 650 is used to simultaneously move the diverter valves 540, 550 and 560 illustrated above. The diverter valve 540 moves about the pivot pin 544. The exhaust gas bypass valve 138 opens and closes as described above. In this example, a rotating member 652 is coupled to a first actuator arm 654 and a second actuator arm 656. As the rotating member 652 moves under the control of a motor 658, the first actuator arm 654 and the second actuator arm 656 move. According to that described below. Each actuator arm 654 and 656 may have a respective compensator 660, 662. Although the type of movement described by the rotating member is rotating, other types of movement for the actuator arms may be implemented. A compensator 660, 662 may thus be implemented in a plurality of different ways. The compensator 660, 662 may be used to compensate for the type of movement as described below.

In this example, when the rotating member 652 is in a starting or home position, the exhaust gas bypass valve is closed and one scroll in the turbine is closed. As the dual actuation system 650 progresses the turbocharger scroll is opened and the diverter valve is positioned in a center position so that both scrolls are open. As the dual actuation system 650 progresses to the end of travel the exhaust gas bypass valve starts to open until it is fully open at the end of the actuator's travel. The exhaust gas bypass valve 138 does not start to open until the diverter valve is in the neutral position and both scrolls are open. Once both scrolls are opened further actuator movement results in no movement of the diverter valve in the turbo. The compensator 660, 662 may be slots or springs that allow the exhaust gas bypass valve to continue to move. The compensators may also be a stop on the diverter valve so that when a diverter valve hits the center position the stop may prevent the adjacent scroll from being closed. A compression spring or other type of compensator may be used so that when the stop is hit, the actuator rod allows the compensator 662 to compress, thus still allowing the actuator to turn the exhaust gas bypass valve 138. Of course, various types of mechanisms for the dual actuation system 650 may be implemented.

Figure 7A:
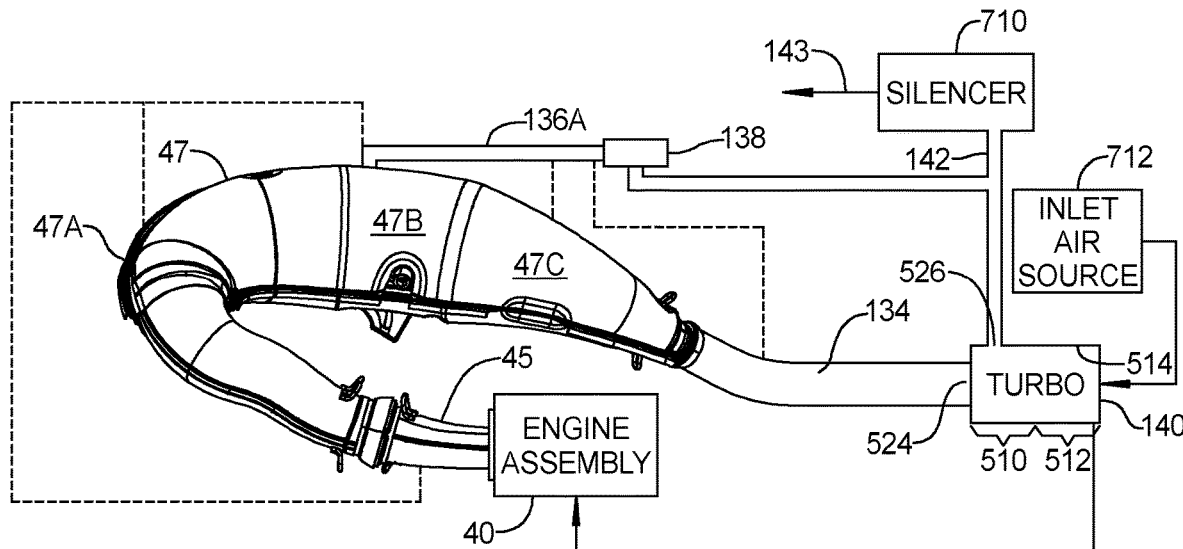
FIG. 7G is a diagrammatic representation of an engine assembly having a third example of an exhaust bypass valve for increasing the stability of a two-stroke engine alternate positions of the exhaust bypass valve are illuminated.
FIG. 7H is a diagrammatic representation of a control valve within a stinger of the exhaust system of a normally aspirated two-stroke engine assembly.
FIG. 7I is a diagrammatic representation of a control valve within a silencer.
FIG. 7J is a diagrammatic representation of a control valve within a sub-chamber of a silencer.
FIG. 7K is a schematic view of another example of bypassing exhaust gas using a silencer and supplemental silencer with a common wall.
Figure 7B:
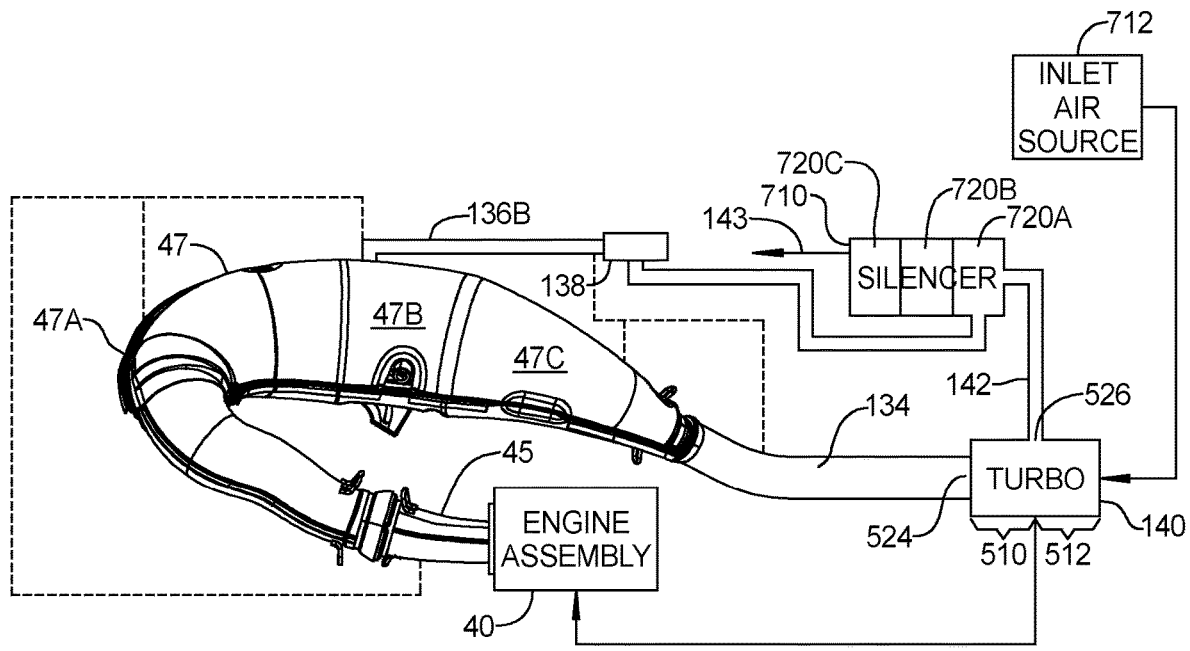
Figure 7C:
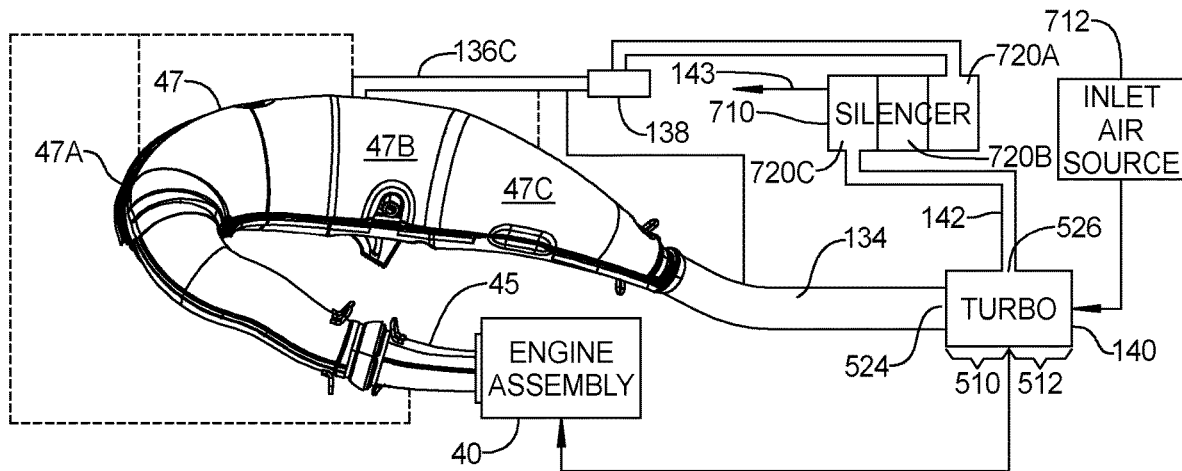

Referring now to FIGS. 7A-7C, the position of the exhaust gas bypass valve 138 relative to the turbocharger and the silencer of the vehicle may be changed. Although the turbocharger 140 is illustrated, the following descriptions may be applied to normally aspirated (non-turbocharged) engines.

Referring now specifically to FIG. 7A, the engine assembly 40 has the exhaust manifold 45 as illustrated above. The tuned pipe 47 communicates exhaust gases from the exhaust manifold 45 to the stinger 134. The stinger 134 is in communication with the turbocharger 140, and in particular the turbine inlet 524 of the turbine portion 510. In a non-turbocharged engine the stinger 134 may be communicated to the silencer 710. Exhaust gases pass through the turbine portion 510 and exit through outlet 526 at a lower total energy. In this example the bypass pipe 136A extends from the tuned pipe 47 to the exhaust pipe 142. In particular, the bypass pipe is illustrated in communication with the center portion 47B of the tuned pipe 47. The exhaust gas bypass valve 138 is positioned within the bypass pipe 136A. The outlet of the bypass pipe 136 communicates with the exhaust pipe 142 before a silencer 710. The silencer 710 has an exhaust outlet 143.

An inlet source 712 communicates air to be compressed to the compressor portion 512 of the turbocharger 140. The compressed air is ultimately provided to the engine assembly 40.

As shown is dotted lines, the bypass pipe 136A may also be coupled to the exhaust manifold 45, the diverging portion 47A of the tuned pipe 47, the converging portion 47C of the tuned pipe or the stinger 134.

Should the turbocharger 524 be removed, the exhaust pipe 142 is connected directly to the stinger 134. The inlet source 712 is not required.

Referring now to FIG. 7B, the silencer 710 may include a plurality of chambers 720A-720C. In the example set forth in FIG. 7B, all of the same reference numerals are used. However, in this example, the bypass pipe 136B communicates exhaust gases around the turbocharger by communicating exhaust gases from the center portion 47B of the tuned pipe 47 through the exhaust gas bypass valve 138 to a first chamber 720A of the silencer 710. It should be noted that the outlet of the bypass pipe 136B is in the same chamber as the exhaust gases entering from the exhaust pipe 142.

As shown in dotted lines, the bypass pipe 136B may also be coupled to the exhaust manifold 45, the diverging portion 47A of the tuned pipe 47, the converging portion 47C of the tuned pipe or the stinger 134.

As in FIG. 7A, should the turbocharger 524 be removed, the exhaust pipe 142 is connected directly to the stinger 134. The inlet source 712 is not required.

Referring now to FIG. 7C, the bypass pipe 136C communicates fluidically from the tuned pipe 47 to a chamber 720A of the silencer 710. In this example, the chamber 720A is different than the chamber that the exhaust pipe 142 from the turbocharger entering the silencer 710. That is, the exhaust pipe 142 communicates with a third chamber 720C of the silencer while the bypass pipe 136C communicates with a first chamber 720A of the silencer 710. Of course, multiple chambers may be provided within the silencer 710. The example set forth in FIG. 7C illustrates that a bypass pipe 136C may communicate exhaust gases to a different chamber than the exhaust pipe 142.

As in the above, should the turbocharger 524 be removed, the exhaust pipe 142 is connected directly to the stinger 134. The inlet source 712 is not required.

Figure 7D:
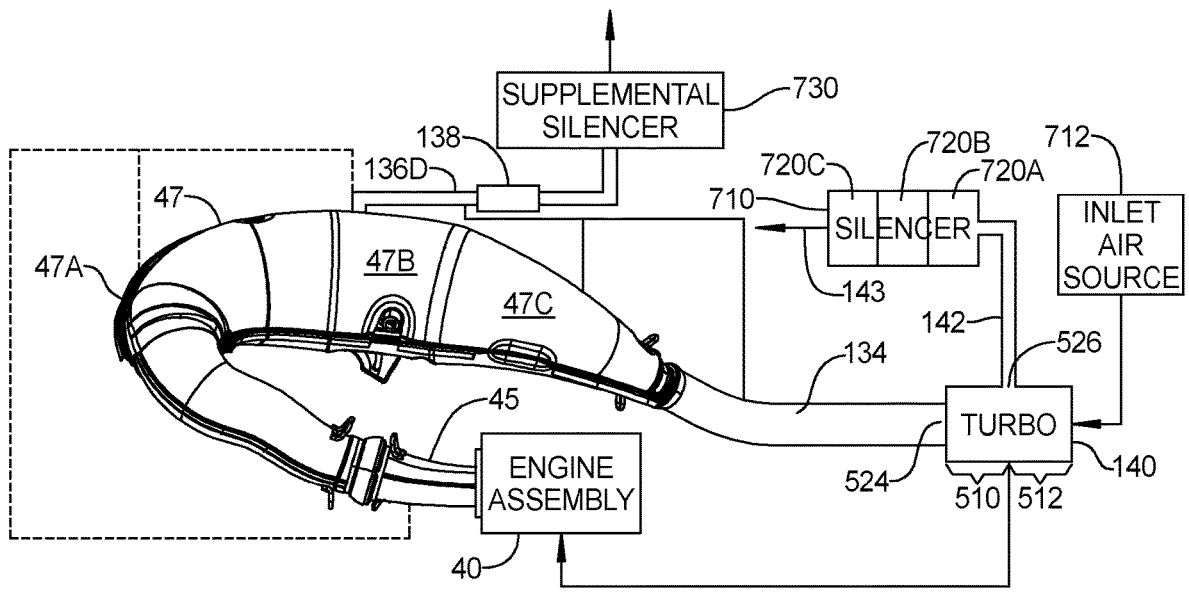

Referring now to FIG. 7D, engine assembly 40 is illustrated having a fourth example of an exhaust gas configuration. In this case, bypass pipe 136D does not connect to the exhaust pipe 142. The outlet of the exhaust gas bypass valve 138 connects to the atmosphere directly or through a supplemental silencer 730 then to the atmosphere. The configuration of FIG. 7D is suitable if packaging becomes an issue.

As shown is dotted lines, the bypass pipes 136C, 136D in FIGS. 7C and 7D may also be coupled to the exhaust manifold 45, the diverging portion 47A of the tuned pipe 47, the converging portion 47C of the tuned pipe or the stinger 134.

As in the above, should the turbocharger 524 be removed, the exhaust pipe 142 is connected directly to the stinger 134. The inlet source 712 is not required.

Figure 7E:
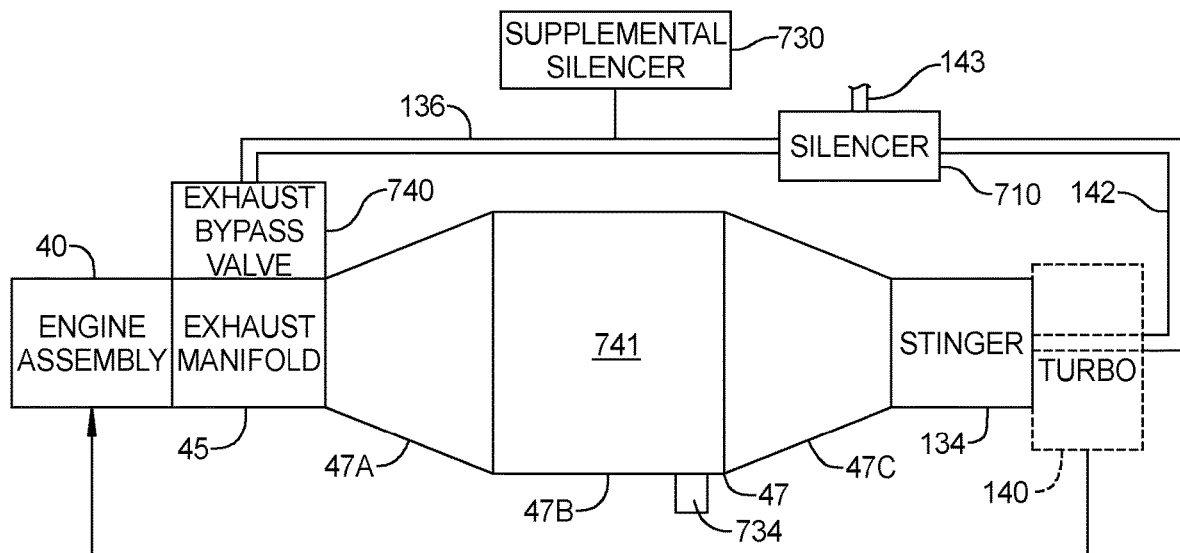

Referring now to FIG. 7E, a two-stroke engine system is set forth. In the present system an engine assembly 40 is coupled to an exhaust manifold 45. The exhaust manifold 45 is in communication with the tuned pipe 47. The tuned pipe 47 has a divergent portion 47A, a center portion 47B and a convergent portion 47C. The divergent portion 47A widens the tuned pipe 47 to the center portion 47B. The center portion 47B may be a relatively straight portion or a portion that has a generally constant cross-sectional area. The convergent portion 47C reduces the diameter of the center portion 47B to a diameter that is in communication with the stinger 134. Exhaust gases from the exhaust manifold 45 travel through the divergent portion 47A and the center portion 47B and the convergent portion 47C in a "tuned" manner. That is, the portions 47A-47C are tuned for the particular design of the engine to provide a certain amount of back pressure. Thus, a certain amount of power and stability is designed into the engine assembly. The exhaust gases travel from the stinger 134 to a silencer 710. As described above a turbocharger 140 may be used to recover some of the energy in the exhaust gases. The tuned pipe 47 has a tuned pipe pressure sensor 734 that is coupled to the tuned pipe 47 to sense the amount of exhaust gas pressure within the tuned pipe 47. The tuned pipe pressure sensor 734 generates a signal corresponding to the exhaust gas pressure within the tuned pipe 47.

An exhaust gas bypass valve 740 in this example is coupled directly to the exhaust manifold 45. The exhaust gas bypass valve 740 provides a bypass path through the bypass pipe 136 which may enter either the silencer 710 or communicate directly to atmosphere through a supplemental silencer 730. Of course, the bypass pipe 136 may be configured as set forth above in the pipe between the turbocharger 140 and the silencer 710. The exhaust gas bypass valve 740 may be electrically coupled to a controller as will be described further below. Based upon various engine system sensor signals, exhaust gas bypass valve 740 may be selectively opened to provide an increase in power and or stability for the engine assembly 40. The exhaust gas bypass valve 740 changes the pressure within the tuned pipe 47 so the airflow through the engine is increased or decreased, by changing the differential pressure across the engine. A change in the airflow may be perceived as an increase in power, engine stability or improved combustion stability or a combination thereof.

Figure 7F:
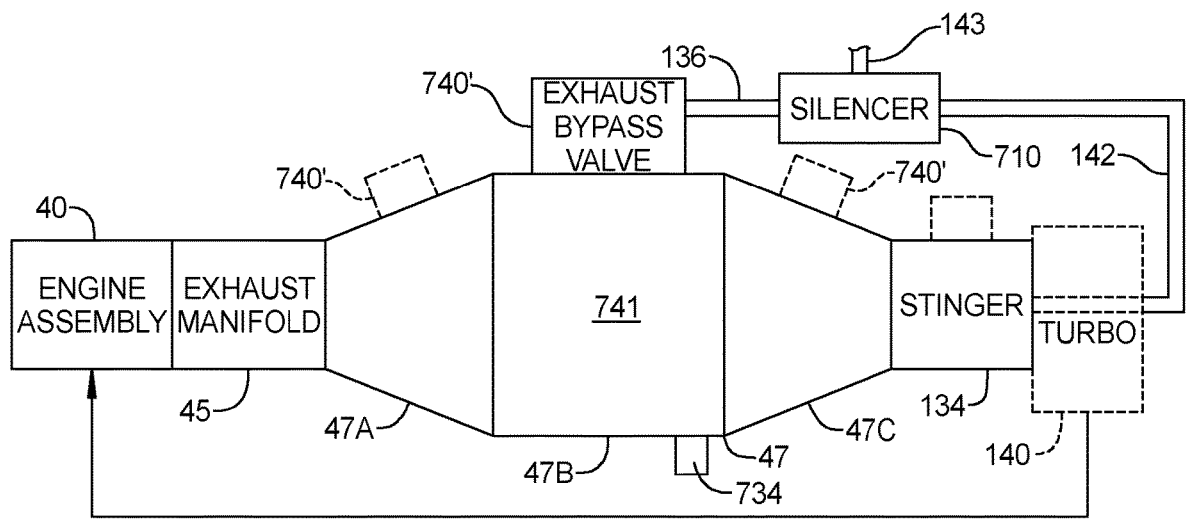

Referring now to FIG. 7F, the exhaust gas bypass valve 740' may be disposed on the center portion 47B of the tuned pipe 47. However, the exhaust gas bypass valve 740' may also be located on the divergent portion 47A or the convergent portion 47C as illustrated in dotted lines. In the example set forth in FIG. 7F the exhaust gas bypass valve 740' is mounted directly to the outer wall 741 of the center portion 47B of the tuned pipe 47. The exhaust gas bypass valve 740' may also be coupled to the stinger 134 also as illustrated in dotted lines.

Figure 7G:
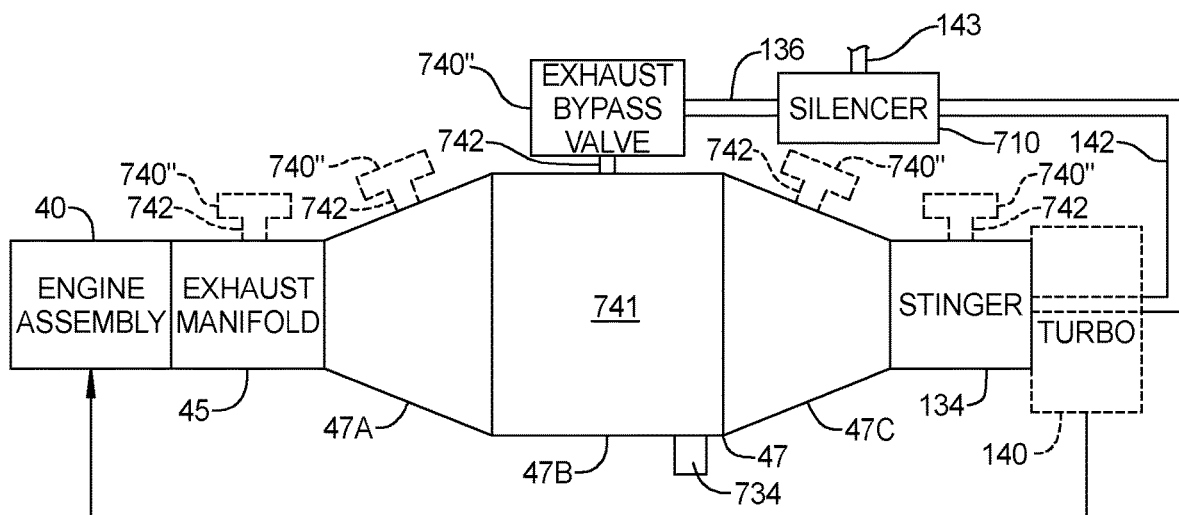

Referring now to FIG. 7G, the exhaust gas bypass valve 740" may be positioned away from the outer wall 741 of the tuned pipe 47 by a standoff pipe 742. The standoff pipe 742 may be very short such as a few inches. That is, the standoff pipe 742 may be less than six inches. Thus, the exhaust gas bypass valve 740" may be positioned in a desirable location by the standoff pipe 742 due to various considerations such as packaging.

In this example standoff pipe 742 and hence the exhaust gas bypass valve 740" is coupled to the center portion 47B of the tuned pipe 47. However, as illustrated in dotted lines, the standoff pipe 742 may be may be coupled to the exhaust manifold 45, the diverging portion 47A, the converging portion 47C or the stinger 134.

The valve 740''' may also be located within the center portion 47B of the tuned pipe 47. The control valve 740''' may also be located within the divergent portion 47A or the convergent portion 47C or in the exhaust manifold 740''' as illustrated in dotted lines.

Figure 7H:
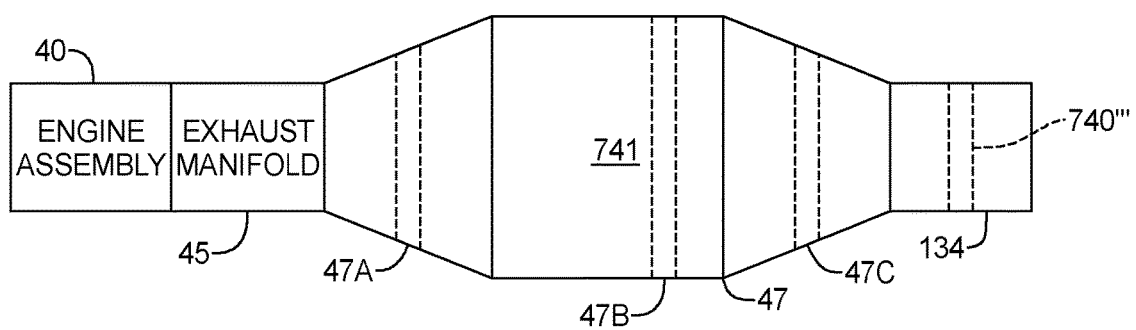

Referring now to FIG. 7H, a control valve 740''' may be disposed within the stinger 134. The control valve 740'' may not communicated bypass exhaust gasses out of the exhaust stream but the valve 740''' may be configured in a similar manner as the exhaust gas bypass valves described above with controlled closed flow through. Valve 740'' may be partially opened in the most closed position to allow some exhaust gasses to flow there through. Although the valve 740''' may be used in a turbocharged application, a normally aspirated application may be suitable as well. The valve 740''' may open in response to various conditions so that the power output of the engine may be adjusted depending on such inputs as throttle, load engine speed, tuned pipe pressure and temperature, exhaust pressure and temperature.

The exhaust gas bypass valves 740, 740', 740'' and 740''' may have various types of configurations. In one example the exhaust gas bypass valve 740-740''' may be configured as an exhaust gas bypass valve similar to that set forth above and used to bypass the turbocharger 140. The structural configuration of the valves 740-740''' may include but are not limited to a butterfly valve, a slide valve, a poppet valve, a ball valve or another type of valve.

Figure 7I:
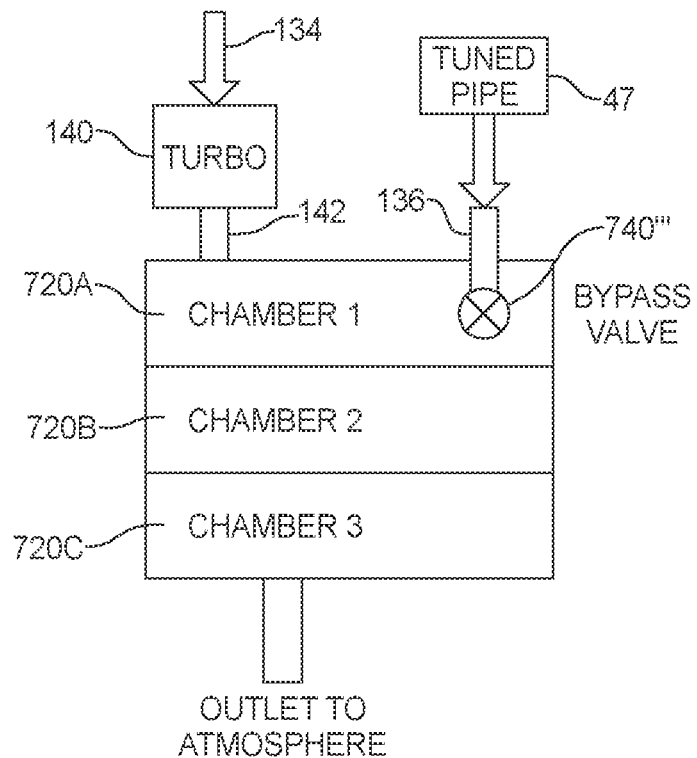

Referring now to FIG. 7I, the exhaust bypass valve 740 illustrated above may be implemented within a chamber 720A of the silencer 710. In this example, the tune pipe 47 communicates exhaust gasses to the silencer 710. The tune pipe 47 may communicate exhaust gasses from a first portion 747A, a center portion 747B, or a third portion 747C. These are illustrated in the above examples. The exhaust bypass valve 740''' is disposed within one of the chambers 720A-720C. In this example, the exhaust bypass valve 740''' is disposed within the first chamber 720A. In this example, the turbocharger 140 communicates exhaust gasses to the silencer through the pipe 142. In this example, the turbocharger 140 is coupled to the pipe 142 which is in communication with the first chamber 720A. However, any one of the chambers 720A-720C may receive exhaust gasses from the turbocharger 140 through the pipe 142.

Figure 7J:
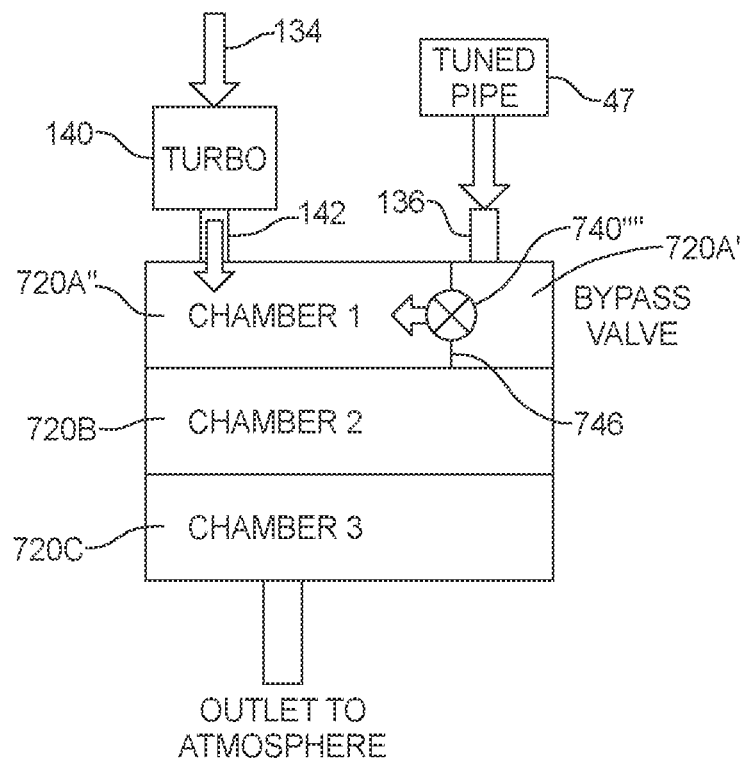

Referring now to FIG. 7J, the chamber 720A illustrated in FIG. 1 is divided into a first chamber portion 720A' and a second portion 720A" which are separated by a wall 746. Exhaust gasses are communicated between the first chamber portion 720A' and the second portion 720A" through the exhaust bypass valve $740^{IV}$.

The valve 740''' and $740^{IV}$ are provided to control the amount of pressure in various tuning characteristics of the tune pipe 47. In FIG. 7J, the turbocharger 140 may be in communication with any one of the chambers 720A", chamber 720B, and chamber 720C.

Any of the chambers 720A-C may be divided into two chambers.

Figure 7K:
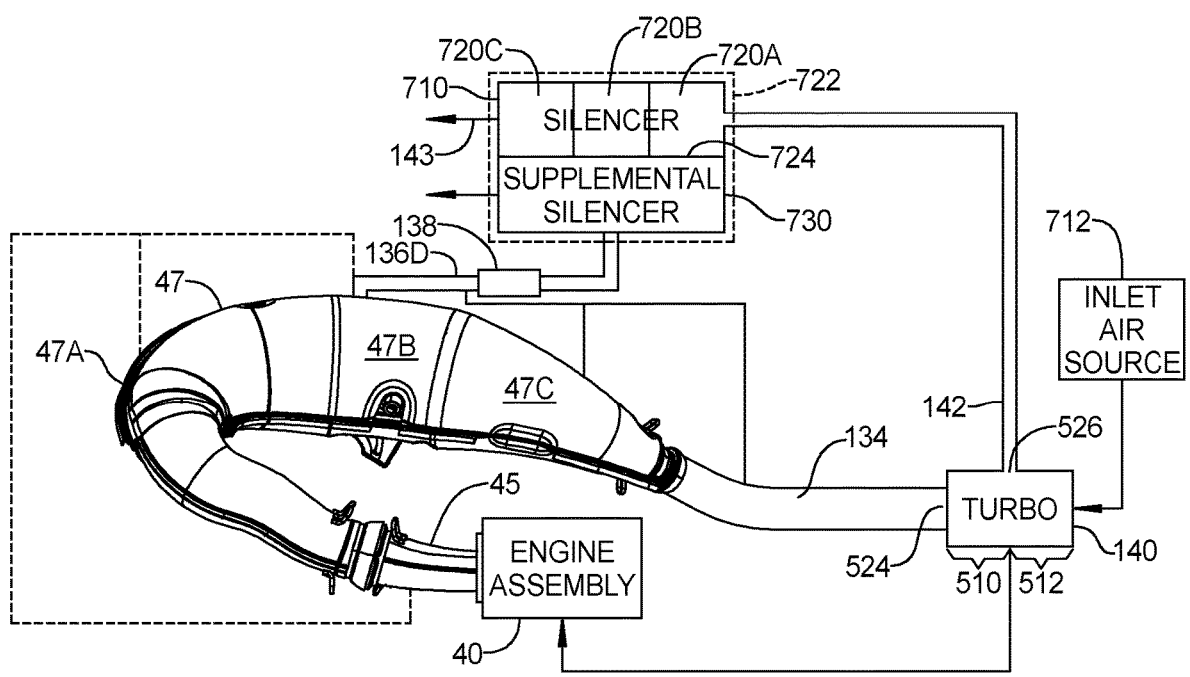

Referring now to FIG. 7K, the supplemental silencer 730 and the silencer 710 may be disposed as a single unit. The supplemental silencer 710 may be disposed in a common housing but maintain separate flow paths from the valve 138 and the turbo 524. The silencer 710 and the supplemental silencer 730 may have a common wall 730 therebetween. The common wall reduces manufacturing costs and vehicle weight by reducing the amount of wall material.

Referring now to FIG. 8A, schematic view of an engine air system that a boost box 810 is illustrated. The boost box 810 has a one way valve 812 coupled therein. The valve 812 may be an active valve such as a motor controlled valve or a passive valve such as a reed valve. When a lower pressure is present in the boost box 810 than the ambient pressure outside the boost box 810, the valve 812 opens and allows air to bypass the compressor portion 512 of the turbocharger 140. That is, a bypass path is established through the boost box from the valve 812 through boost box 810 to the engine. That is, the air through the valve 812 bypasses the compressor portion 512 of the turbocharger 140 and the air in boost box 810 is directed to the air intake or throttle body of the engine assembly 40.

The one-way valve 812 may be a reed valve as illustrated in further detail in FIG. 8F. By using a one way valve 812, engine response is improved to activate turbocharger 140 sooner. When the engine response is improved the turbo lag is reduced by allowing the engine to generate exhaust mass flow quicker, in turn forcing the turbine wheel speed to accelerate quicker. When the compressor portion 512 of the turbocharger 140 builds positive pressure the one way valve 812 closes. When implemented, a decrease in the amplitude and duration of the vacuum present in the boost box 810 was achieved. In response, the engine speed increased sooner, and the compressor built positive pressure sooner.

Referring now to FIGS. 8A-8F, the boost box 810 has the one way valve 812 as described above. The one way valve 812 allows air into the boost box 810 while preventing air from leaving the boost box 810. The boost box 810 also includes a compressor outlet 814. The compressor outlet 814 receives pressurized air from the compressor portion 512 of the turbocharger 140. However, due to turbo lag the compressor takes some time to accelerate and provide positive pressure to the boost box 810 particularly when wide open throttle is demanded suddenly from a closed or highly throttled position.

The boost box 810 also includes a pair of intake manifold pipes 816 that couple to the throttle body 90 of the engine assembly 40.

A portion of a fuel rail 820 is also illustrated. The fuel rail 820 may be coupled to fuel injectors 822 that inject fuel into the boost box 810 or throttle body 90. The fuel rail 820 and fuel injectors 822 may also be coupled directly to the throttle body 90.

A boost pressure sensor 824 may also be coupled to the boost box 810 to generate an electrical signal corresponding to the amount of pressure in the boost box 810, which also corresponds to the boost provided from the compressor portion 512 of the turbocharger 140.

Referring now to FIG. 8F, the one way valve 812 is illustrated in further detail. The one way valve 812 may include a plurality of ports 830 that receive air from outside of the boost box 810 and allow air to flow into the boost box 810. That is, when a lower pressure is developed within the boost box 810 such as under high acceleration or load, the turbocharger 140 is not able to provide instantaneous boost and thus air to the engine is provided through the one way valve 812 to reduce or eliminate any negative pressure, relative to ambient pressure outside the boost box, within the boost box 810. When compressor portion 512 of the turbocharger 140 has reached operating speed and is pressurizing the boost box 810, the pressure in the boost box 810 increases and the one way valve 812 closed. That is, the ports 830 all close when pressure within the boost box 810 is higher than the ambient pressure outside the boost box.

Referring now to FIG. 8G, the boost box 810 is illustrated within an engine compartment 832. The engine compartment 832 roughly illustrates the engine assembly 40 and the turbocharger 140. In this example the one way valve 812 is illustrated rearward relative to the front of the vehicle. The position of the one way valve 812 allows cooler air to be drawn into the boost box 810.

Referring now to FIG. 8H, the one way valve 812 may be coupled to a duct 840. The duct 840 allows cooler air to be drawn into the boost box 810 from a remote location. In this example, an upper plenum 842 is coupled to the duct 840. The upper plenum may pass the air through a filter 862, such as a screen or fine mesh, prior to being drawn into the boost box 810. The filter 862 may filter large particles and prevent damage to the boost box 810 and the one way valve 812. The upper plenum receives air from a vent 846. A filter 862' may be located at the vent 846 or between the vent 846 and upper plenum 842. Of course, in one system one filter 862 or the other filter 862' may be provided.

The vent 846 may be located in various places on the vehicle. For example, the vent 846 may draw air externally though the hood of the vehicle, the console of the vehicle or from a location under the hood that has clean and cool air.

Referring now to FIG. 8I, a channel 850 may be formed in the fuel tank 852. That is, the channel 850 may act as the duct 840 illustrated above in FIG. 8H. The channel 850 may be integrally formed into the outer walls 854 of the fuel tank. The boost box 810 may be attached to the fuel tank 852 so that the air drawn into the boost box 810 is received through the channel 850. A seal 856 may be used between the boost box and the fuel tank 852 so that the air is completely drawn through the channel 850. Various types of seals may be used. Rubber, foam, thermoplastics are some examples. The seal 856 may be a gasket. A duct 860 may be coupled between the fuel tank 852 and the boost box 810 to receive air from a remote location such as the vent 846 illustrated in FIG. 8H or another location within the engine compartment 832 of the vehicle. Of course, the duct 860 may draw air from other portions of the vehicle or outside the vehicle. A filter or screen 862 may be used to prevent debris from entering the channel 850.

Referring now to FIG. 9A, a block diagrammatic view of a control system for a two-stroke turbocharged engine is set forth. In this example a controller 910 is in communication with a plurality of sensors. The sensors include but are not limited to a boost pressure sensor 912, an engine speed sensor 914, an atmospheric (altitude or barometric) pressure sensor 916, a throttle position sensor, tuned pipe pressure sensor 734, an exhaust valve position sensor 937 and an exhaust manifold pressure sensor. Each sensor generates an electrical signal that corresponds to the sensed condition. By way of example, the boost pressure sensor 912 generates a boost pressure sensor signal corresponding to an amount of boost pressure. The engine speed sensor 914 generates an engine speed signal corresponding to a rotational speed of the crankshaft of the engine and the atmospheric pressure sensor 916 generates a barometric pressure signal corresponding to the atmospheric ambient pressure.

The tuned pipe pressure sensor 734 may also be in communication with the controller 910. The tuned pipe pressure sensor 734 generates a tuned pipe pressure signal corresponding to the exhaust pressure within the tuned pipe 47 as described above. The exhaust valve position sensor 937 and the exhaust manifold pressure sensor 939 generates a respective exhaust valve position signal corresponding to the position of the exhaust valve and the pressure in the exhaust manifold.

The controller 910 is used to control an actuator 920 which may be comprised of an exhaust gas bypass valve actuator 922 and exhaust gas diverter valve actuator 924. An example of the actuator is illustrated in FIG. 6I above. Of course, as mentioned above, the actuators may be one single actuator. The actuator 922 is in communication with the exhaust gas bypass valve 138. The actuator 924 is in communication with the exhaust gas diverter valve 540. The controller 910 ultimately may be used to determine an absolute pressure or a desired boost pressure.

A boost error determination module 930 is used to determine a boost error. The boost error is determined from the boost pressure sensor 912 in comparison with the desired boost pressure from the boost pressure determination module 932. The boost pressure error in the boost pressure determination module 930 is used to change an update rate for determining the boost pressure for the system. That is, the boost error determination is determined at a first predetermined interval and may be changed as the boost error changes. That is, the system may ultimately be used to determine an update rate at a faster rate and, as the boost pressure error is lower, the boost pressure determination may determine the desired boost pressures at a lower or slower rate. This will be described in further detail below. This is in contrast to typical systems which operate a PID control system at a constant update rate. Ultimately, the determined update rate is used to control the exhaust gas bypass valve using an exhaust gas bypass valve position module 934 which ultimately controls the actuator 920 or actuator 922 depending if there is a dedicated actuator for the exhaust gas bypass valve 138. By determining the boost target in the boost pressure determination module 932, the update rate may be changed depending on the amount of boost error. By slowing the calculations, and subsequent system response, during the approach of the target boost value, overshoot is controlled and may be reduced. Also, the update rate may be increased to improve system response when large boost errors are observed.

The controller 910 may be coupled to a detonation sensor 935. The detonation sensor 935 detects detonation in the engine. Detonation may be referred to as knock. The detonation sensor 935 may detect an audible signal.

The controller 910 may also include an absolute pressure module 936 that keeps the engine output constant at varying elevations. That is, by comparing the altitude or barometric pressure from the atmospheric pressure sensor 916, the boost pressure may be increased as the elevation of the vehicle increases, as well as to compensate for increased intake air charge temperature due to increased boost pressure to maintain constant engine power output. This is due to the barometric pressure reducing as the altitude increases. Details of this will be set forth below.

The controller 910 may also include a second exhaust gas bypass valve position control module 938. The exhaust gas bypass valve position control module 938 is used to control the exhaust gas bypass valve and position the actuator 926 which may include a motor or one of the other types of valve described above. The exhaust gas bypass valve position control module 938 may be in communication with the sensors 912-918, 935 and 734. The amount of pressure within the tuned pipe may affect the stability and power of the engine. Various combinations of the signals may be used to control the opening of the exhaust gas bypass valve 740-740". The exhaust gas bypass valves 740-740" may, for example, be controlled by feedback from the tuned pipe pressure sensor 734. The tuned pipe pressure sensor signal may be windowed or averaged to obtain the pressure in the tuned pipe as a result of the opening or closing of the exhaust gas bypass valve 740-740". The tuned pipe pressure sensor 734 may be used in combination with one or more of the other sensors 912-918, 734 and others to control the opening and closing of the exhaust gas bypass valve 740-740". The boost pressure or average boost pressure from the boost pressure sensor 912 may also be used to control the exhaust gas bypass valves 740-740". The boost pressure determination module 932 may provide input to the exhaust gas bypass valve position control module 938 to control the exhaust gas bypass valve based upon the boost pressure from the boost pressure determination module 932 as described above.

A map may also be used to control the specific position of the exhaust gas bypass valve 740-740". For example, the engine speed signal, the throttle position signal and/or the barometric pressure signal may all be used together or alone to open or close the exhaust gas bypass valve 740-740" based on specific values stored within a pre-populated map.

Referring now to FIG. 9B, in step 940 the actual boost pressure is measured by the boost pressure sensor 912 as mentioned above. In step 942 a boost pressure error is determined. Because this is an iterative process, the boost error is determined by the difference between the target boost and the actual boost pressure. Once the process is cycled through once, a boost error will be provided to step 942.

Referring to step 944, the update interval is changed based upon the boost error determination in step 942. That is, the boost error is used to determine the update rate of the exhaust gas bypass valve control method. That is, the update rate corresponds to how fast the method of determining error, then moving the exhaust gas bypass valve actuator, and determine timing of the next cycle is performed. As mentioned above, as the actual boost or measured boost pressure becomes closer to the target boost pressure the update rate is reduced in response to the observed boost error.

In step 946 a desired absolute pressure is established. Step 946 may be established by the manufacturer during the vehicle development. The desired absolute pressure may be a design parameter. In step 948 the barometric pressure of the vehicle is determined. The barometric pressure corresponds to the altitude of the vehicle. In step 950 a required boost pressure to obtain the absolute pressure and overcome additional system losses due to elevation is determined. That is, the barometric pressure is subtracted from the required absolute pressure to determine the desired boost pressure. In step 952 the exhaust gas bypass valve and/or the exhaust gas diverter valve for the twin scroll turbocharger is controlled to obtain the desired boost pressure. Because of the mechanical system the desired boost pressure is not obtained instantaneously and thus the process is an iterative process. That is, the required boost pressure from step 950 is fed back to step 942 in which the boost error is determined. Further, the after step 952 step 940 is repeated. This process may be continually repeated during the operation of the vehicle.

Referring now to FIG. 9C, a throttle position sensor 918 may provide input to the controller 910. The throttle position sensor signal 954 is illustrated in FIG. 9C. The engine speed signal 960 is also illustrated. The signal 958 illustrates the position of the exhaust gas bypass valve. The signal 956 illustrates the amount of boost error.

Referring now to FIG. 9D, a plot of a calculation multiplier delay versus the absolute boost error pressure is set forth. As can be seen as the boost error decreases the frequency of calculations decreases. That is, as the boost error increases the frequency of calculations increases.

Referring now to FIG. 9E, a plot of absolute manifold pressure versus elevation is set forth. The barometric pressure and the boost pressure change to obtain the total engine power or target absolute pressure. That is, the absolute pressure is a design factor that is kept relatively constant during the operation of the vehicle. As the elevation increases the amount of boost pressure also increases to compensate for the lower barometric pressure at higher elevations as well as increased intake air temperature.

Referring now to FIG. 9F, a method for operating the exhaust gas bypass valve 740-740" is set forth. In this example the various engine system sensors are monitored in step 964. The engine sensors include but are not limited to the boost sensor 912, the engine speed sensor 914, the altitude/barometric pressure sensor 916, the throttle position sensor 918 and the tuned pipe pressure sensor 734.

In step 966 the exhaust gas bypass valve 740-740" is adjusted based upon the sensed signals from the sensors. The adjustment of the opening in step 966 may be calibrated based upon the engine system sensors during development of the engine. Depending upon the desired use, the load and other types of conditions, various engine system sensors change and thus the amount of stability and power may also be changed by adjusting the opening of the exhaust gas bypass valve.

In step 968, the pressure within the tuned pipe is changed in response to adjusting the opening of the exhaust gas bypass valve 740-740". In response to changing the pressure within the tuned pipe, the airflow through the engine is changed. When the airflow through the engine is changed the stability of the engine, the power output of the engine or the combustion stability or combinations thereof may also be improved. It should be noted that the opening of the exhaust gas bypass valve 740-740" refers to the airflow though the exhaust gas bypass valve 740-740". Thus, the opening may be opened and closed in response to the engine system sensors.

Referring now to FIG. 9G, the exhaust gas bypass valve position control module 934 is illustrated in further detail. As mentioned above, the exhaust gas bypass valve effective area may be varied depending on various operating conditions. The addition of a turbocharger to a two-stroke engine adds the restriction of the turbine which causes the engine to respond slower than a naturally aspirated engine of similar displacement. The loss of response caused from the turbine may be viewed by a vehicle operator as turbo lag.

The exhaust gas bypass valve position module 934 is illustrated having various components used for controlling the exhaust gas bypass valve. An idle determination module 970 is used to receive the engine speed signal. The idle determination module may determine that the engine speed is below a predetermined speed. A range of speeds may be used to determine whether or not the engine is at idle. For example, a range between about 1000 and 2000 rpms may allow the idle determination module 970 to determine the engine is within or at an idle speed. Idle speeds vary depending on the engine configuration and various other design parameters. Once the engine is determined to be at idle the exhaust gas bypass valve effective area module 972 determines the desired effective exhaust gas bypass valve area for the exhaust gas bypass valve. The exhaust gas bypass valve effective area module 972 determines the opening or effective area of the exhaust gas bypass valve for the desired control parameter. For idle speed, a first effective exhaust gas bypass valve area may be controlled. That is, one effective exhaust gas bypass valve area may be used for idle speed determination. Once the exhaust gas bypass valve area is determined the exhaust gas bypass valve actuator 922 may be controlled to open the exhaust gas bypass valve a first predetermined amount. The exhaust gas bypass valve for idle may be opened a small effective area. That is, the exhaust gas bypass valve may be opened further than a fully closed position but less than a fully opened position. For exhaust gas bypass valve such as those illustrated in FIG. 6 above about twenty degrees of opening may be commanded during the idling of the two-stroke engine. By opening the exhaust gas bypass valve a predetermined amount some of the exhaust gases are bypassed around both the turbine portion 510 of the turbocharger 140 and the stinger 134 at the end of the tuned pipe. The effective predetermined area may change depending on various sensors including but limited to in response to one or more of the engine speed from the engine speed sensor, throttle position from the throttle position sensor or a detonation from the detonation sensor.

The exhaust gas bypass valve position control module 934 may also control the exhaust gas bypass valve position during acceleration or to improve engine stability. Acceleration of the engine may be determined in various ways including monitoring the change in engine speed, monitoring the throttle position or monitoring the load on the engine. Of course, combinations of all three may be used to determine the engine is accelerating. When the engine is accelerating as determined in the acceleration determination module 974 the exhaust gas bypass valve effective area module 972 may hold the exhaust gas bypass valve open a predetermined amount. The predetermined amount may be the same or different than the predetermined amount used for the engine idle. Again, some of the exhaust gases are bypassed around the stinger 134 and the turbine portion 510 of the turbocharger 140. The determined exhaust gas bypass valve effective area is then commanded by the exhaust gas bypass valve effective area module 972 to control the exhaust gas bypass valve actuator module 922. In a similar manner, the engine sensor may be used to monitor engine stability. In response, the wastegate may open for various amounts of time to increase engine stability.

Referring now to FIG. 9H, a method for operating the exhaust gas bypass valve in response to acceleration and idle is set forth. In step 980 the engine speed is determined. As mentioned above, the crankshaft speed may be used to determine the speed of the engine. In step 982 is to determine whether the engine is at idle. Determining the engine is at idle may be performed by comparing the engine speed to a threshold or thresholds. The engine speed below a threshold or between two different thresholds may signal the engine is at idle. When the engine is at idle, step 984 determines an effective area for the exhaust gas bypass valve and opens the exhaust gas bypass valve accordingly. In step 986 some of the exhaust gases are bypassed around the stinger 134 and the turbine portion 510 as described above.

When the engine is not at idle in step 982 and after step 986, step 988 determines whether the engine is in an acceleration event. As mentioned above, the acceleration event may be determined by engine speed alone, load alone or the throttle position or combinations of one or more of the three. When the engine is in an acceleration event step 990 holds the exhaust gas bypass valve to a predetermined amount to reduce the backpressure. The predetermined amount may be the same predetermined amount determined in step 984. The effective area may be controlled by the valve in the exhaust gas bypass valve or another type of opening control in a different type of exhaust gas bypass valve. In step 992 some of the exhaust gases are bypassed around the stinger 134 and turbine portion 510.

Referring back to step 988, if the engine is not in an acceleration event the engine operates in a normal manner. That is, in step 994 the boost pressure or exhaust backpressure is determined. In step 996 the exhaust gas bypass valve opening is adjusted based upon the boost pressure, the exhaust backpressure or both. After step 996 and step 992 the process repeats itself in step 980.

Referring now to FIGS. 10A, 10B, 10C and 10D, the compressor wheel 519, the turbine wheel 520 and the shaft 521 are illustrated in further detail. The compressor wheel 519 is used to compress fresh air into pressurized fresh air. The compressor wheel 519 includes an inducer diameter 1010 and an exducer diameter 1012. The inducer diameter 1010 is the narrow diameter of the compressor wheel. The exducer diameter 1012 is the widest diameter of the compressor wheel 519.

The turbine wheel 520 includes an exducer diameter 1020 and an inducer diameter 1022. The exducer diameter 1020 is the small diameter of the turbine wheel 520. The inducer diameter 1022 is the widest diameter of the turbine wheel 520. That is, the top of the blades 1024 have the exducer diameter 1020 and the lower portion of the blades 1024 have the inducer diameter 1022. The exducer diameter 1020 is smaller than the inducer diameter 1022. The area swept by the blades 1024 is best illustrated in FIG. 10C which shows the exducer area 1030 and the inducer area 1032. The area of the port of the exhaust gas bypass valve was described above relative to FIG. 6G. The port area is the amount of area available when the valve member 614 is fully open. By sizing the area of the exhaust gas bypass valve port in a desirable way the operation of the two-stroke engine performance is increased. As has been experimentally found, relating the exhaust gas bypass valve effective area (port area) to the area of the turbine wheel exducer is advantageous. The exducer area 1030 may be determined by the geometric relation π times half of the exducer diameter squared. By way of a first example, the port area for a two-stroke engine may be greater than about thirty-five percent of the exducer area. The port area of the exhaust gas bypass valve may be greater than about fifty percent of the exducer area. In other examples the port area of the exhaust gas bypass valve may be greater than about sixty percent of the exducer area. In another example the port area of the exhaust gas bypass valve may be greater than about sixty-five percent of the exducer area. In yet another example the port area of the exhaust gas bypass valve may be greater than about sixty-five percent and less than about ninety percent of the exducer area. In another example the port area of the exhaust gas bypass valve may be greater than about sixty-five percent and less than about eighty percent of the exducer area. In yet another example the port area of the exhaust gas bypass valve may be greater than about seventy percent and less than about eighty percent of the exducer area. In yet another example the port area of the exhaust gas bypass valve may be greater than about seventy-five percent and less than about eighty percent of the exducer area.

As is mentioned above, the exhaust gas bypass valve may be incorporated into a two-stroke engine. The exhaust gas bypass valve may be in communication with the tuned pipe 47 and bypassing the turbocharger through a bypass pipe 136. The exhaust gas bypass valve 138 may be coupled to the center portion of the tuned pipe 47 The effective area of the port is determined using the diameter $P_1$ shown in FIG. 6G and subtracting the area of the valve member 614 and the axle 618.

Referring now to FIG. 10D, a plot of the ratio/percentage of exhaust gas bypass valve or bypass valve area to exducer area for known four stroke engines, two stroke engines and the present example are illustrated. As was observed, providing a higher ratio improved engine performance. The ratios or percentages may be used is four stroke and two stroke engines. From the data set forth is FIG. 10D, four stoke engines have a maximum ratio of the port area to the exducer area of 0.5274 or 52.74 percent and for two stroke engines a 35.54 percentage port area to exducer area was found.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of controlling a turbocharged two stroke engine having an exhaust gas bypass valve comprising;
   determining an engine speed;
   when the engine speed is at idle, partially opening the exhaust gas bypass valve with a first predetermined effective area greater than fully closed;
   determining an acceleration event; and
   holding the exhaust gas bypass valve open at least a second predetermined effective area greater than fully closed in response to the acceleration event.

2. The method of claim 1 wherein the first predetermined effective area corresponds to a first predetermined valve angle and the second predetermined effective area corresponds to a second predetermined valve angle, said first predetermined valve angle and different than the second predetermined valve angle.

3. The method of claim 1 wherein the first predetermined effective area corresponds to a first predetermined valve angle and the second predetermined effective area corresponds to a second predetermined valve angle, said first predetermined valve angle being about equal to the second predetermined valve angle.

4. The method of claim 1 further comprising determining a boost pressure; and adjusting the exhaust gas bypass valve opening from the first predetermined effective area or the second effective predetermined area to a third effective area in response to the boost pressure.

5. The method of claim 1 further comprising determining an exhaust back pressure; and adjusting the exhaust gas bypass valve opening from the first predetermined effective area or the second effective predetermined area to a third effective area in response to the exhaust back pressure.

6. The method of claim 1 wherein determining the acceleration event comprise determining an acceleration event from an engine speed signal.

7. The method of claim 1 wherein determining the acceleration event comprise determining an acceleration event from a throttle position signal.

8. The method of claim 1 wherein determining the acceleration event comprise determining an acceleration event from an engine load signal or calculation.

9. The method of claim 1 further comprising bypassing exhaust gasses around a stinger and a turbocharger after partially opening the exhaust gas bypass valve.

10. The method of claim 1 further comprising bypassing exhaust gasses around a stinger and a turbocharger in response to holding the exhaust gas bypass valve open.

11. A system comprising:
    an engine speed sensor determining an engine speed;
    an exhaust gas bypass valve;

an exhaust gas bypass valve actuator coupled to the exhaust gas bypass valve; and a controller partially opening the exhaust gas bypass valve with a first predetermined effective area greater than fully closed when the engine speed is at idle and said controller determining an acceleration event, holding the exhaust gas bypass valve open at least a second predetermined effective area greater than fully closed in response to the acceleration event.

12. The system of claim 11 wherein the first predetermined effective area corresponds to a first predetermined valve angle and the second predetermined effective area corresponds to a second predetermined valve angle, said first predetermined valve angle and different than the second predetermined valve angle.

13. The system of claim 11 wherein the first predetermined effective area corresponds to a first predetermined valve angle and the second predetermined effective area corresponds to a second predetermined valve angle, said first predetermined valve angle being about equal to the second predetermined valve angle.

14. The system of claim 11 further comprising determining a boost pressure; and adjusting the exhaust gas bypass valve opening from the first predetermined effective area or the second effective predetermined area to a third effective area in response to the boost pressure.

15. The system of claim 11 further comprising determining an exhaust back pressure; and adjusting the exhaust gas bypass valve opening from the first predetermined effective area or the second effective predetermined area to a third effective area in response to the exhaust back pressure.

16. The system of claim 11 further comprising determining engine speed, throttle position or a detonation; and adjusting the exhaust gas bypass valve opening from the first predetermined effective area or the second effective predetermined area to a third effective area in response to the engine speed, throttle position or a detonation.

17. The system of claim 11 wherein determining the acceleration event comprise determining the acceleration event from an engine speed signal.

18. The system of claim 11 wherein determining the acceleration event comprise determining an acceleration event from a throttle position signal.

19. The system of claim 11 further comprising bypassing exhaust gasses around a stinger and a turbocharger after partially opening the exhaust gas bypass valve.

20. The system of claim 11 further comprising bypassing exhaust gasses around a stinger and a turbocharger in response to holding the exhaust gas bypass valve open.

* * * * *